(12) United States Patent
Nakazaki et al.

(10) Patent No.: US 10,486,551 B2
(45) Date of Patent: Nov. 26, 2019

(54) LOAD-DETECTING DEVICE WITH PRESSED SURFACE MOVABLE RELATIVE TO MOUNT SURFACE

(71) Applicant: Fujikura Ltd., Tokyo (JP)

(72) Inventors: Shigeru Nakazaki, Tokyo (JP); Nobuyoshi Ito, Tokyo (JP); Tetsuya Kawahira, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 155 days.

(21) Appl. No.: 15/563,293

(22) PCT Filed: Mar. 30, 2016

(86) PCT No.: PCT/JP2016/060465
§ 371 (c)(1),
(2) Date: Sep. 29, 2017

(87) PCT Pub. No.: WO2016/159123
PCT Pub. Date: Oct. 6, 2016

(65) Prior Publication Data
US 2018/0072186 A1 Mar. 15, 2018

(30) Foreign Application Priority Data
Mar. 30, 2015 (JP) .................................. 2015-069778

(51) Int. Cl.
*G01L 1/00* (2006.01)
*B60N 2/00* (2006.01)
(Continued)

(52) U.S. Cl.
CPC ............ *B60N 2/002* (2013.01); *B60N 2/7094* (2013.01); *B60N 2/90* (2018.02); *G01L 1/2206* (2013.01);
(Continued)

(58) Field of Classification Search
CPC ........ B60N 2/002; B60N 2/90; B60N 2/7094; G01L 1/2206; H01H 13/16; H01H 35/00;
(Continued)

(56) References Cited

U.S. PATENT DOCUMENTS

2008/0046152 A1 2/2008 Ohtake et al.
2012/0251789 A1* 10/2012 Tanaka ............... H01L 21/67092
428/170
(Continued)

FOREIGN PATENT DOCUMENTS

CN 101005973 A 7/2007
EP 2 450 228 A2 5/2012
(Continued)

OTHER PUBLICATIONS

Notice of Allowance dated Aug. 28, 2018, issued in counterpart Japanese Application No. 2017-154619, with English machine translation. (6 pages).
(Continued)

*Primary Examiner* — Max H Noori
(74) *Attorney, Agent, or Firm* — Westerman, Hattori, Daniels & Adrian, LLP

(57) ABSTRACT

A load-detecting device 1 includes a load detection sensor unit SU and a base 2 on which the load detection sensor unit SU is mounted, and the load detection sensor unit SU includes an upper surface 47S configured to be pressed by a seat cushion SC, a first electrode 52, and a second electrode 62. The upper surface 47S moves with respect to the mount surface 21S such that an angle of the upper surface 47S with respect to the mount surface 21S changes.

10 Claims, 8 Drawing Sheets

(51) Int. Cl.
- *B60N 2/90* (2018.01)
- *H01H 13/16* (2006.01)
- *H01H 35/00* (2006.01)
- *B60N 2/70* (2006.01)
- *G01L 1/22* (2006.01)
- *A47C 7/30* (2006.01)
- *A47C 31/12* (2006.01)

(52) U.S. Cl.
CPC ............ *H01H 13/16* (2013.01); *H01H 35/00* (2013.01); *A47C 7/30* (2013.01); *A47C 31/126* (2013.01); *H01H 2203/038* (2013.01); *H01H 2205/018* (2013.01)

(58) Field of Classification Search
CPC ........ H01H 2203/038; H01H 2205/018; A47C 7/30; A47C 31/126
USPC .................................... 73/862.381
See application file for complete search history.

(56) References Cited

U.S. PATENT DOCUMENTS

| | | | |
|---|---|---|---|
| 2015/0137569 A1* | 5/2015 | Goedert | B60N 2/7094 297/217.1 |
| 2016/0081483 A1* | 3/2016 | Harrison | A47C 31/126 297/217.2 |
| 2016/0214505 A1 | 7/2016 | Nakazaki et al. | |
| 2018/0086228 A1* | 3/2018 | Nakazaki | B60N 2/90 |

FOREIGN PATENT DOCUMENTS

| | | |
|---|---|---|
| EP | 2450229 A2 | 5/2012 |
| EP | 3 045 080 A1 | 7/2016 |
| JP | 49-98763 U | 8/1974 |
| JP | 53-33792 Y2 | 8/1978 |
| JP | 9-240424 A | 9/1997 |
| JP | 2002-228516 A | 8/2002 |
| JP | 2011-105278 A | 6/2011 |
| JP | 2012-121363 A | 6/2012 |
| JP | 2014-84069 A | 5/2014 |
| WO | 2013/002289 A1 | 1/2013 |
| WO | 2013/178486 A1 | 12/2013 |
| WO | 2015/037586 A1 | 3/2015 |

OTHER PUBLICATIONS

Extended (Supplementary) European Search Report dated Oct. 30, 2018, issued in counterpart EP application No. 16773004.3. (10 pages).

Office Action dated Apr. 16, 2018, issued in counterpart Chinese Application No. 201680001508.0. (7 pages).

Office Action dated Jun. 5, 2018, issued in counterpart Japanese Application No. 2017-154619, with English machine translation. (4 pages).

International Search Report dated Jun. 28, 2016, issued in counterpart application No. PCT/JP2016/060465. (2 pages).

Decision to Grant a Patent dated Sep. 5, 2017, issued in counterpart Japanese Patent Application No. 2016-556910, w/English translation (6 pages).

Notification of Reasons for Refusal dated Jun. 27, 2017, issued in counterpart Japanese Patent Application No. 2016-556910, w/English translation (6 pages).

* cited by examiner

LOAD-DETECTING DEVICE WITH PRESSED SURFACE MOVABLE RELATIVE TO MOUNT SURFACE

TECHNICAL FIELD

The present invention relates to a load-detecting device that is suitable for properly detecting a load.

BACKGROUND ART

As one of safety systems in vehicles, an alarm system for warning that a seat belt is not worn during ride is practically used. This alarm system warns when wearing of the seat belt is not sensed in a state where sitting of a person is sensed. As a device for sensing sitting of a person, a load-detecting device for detecting a load due to sitting may be used.

Some of such load-detecting devices may be disposed under a seat cushion of a seat. In a seat device, a seat cushion may be disposed on a seat pan, or a seat cushion may be disposed on a plurality of S springs fixed to a frame. In a seat device in which a seat cushion is disposed on a plurality of S springs, a load-detecting device may be engaged with the S springs. Patent Literature 1 listed below describes a sitting detection device as such a load-detecting device. The sitting detection device disclosed in Patent Literature 1 includes a base engaged with S springs and a membrane switch disposed on the base through a spacer.

[Patent Literature 1] JP-A-2011-105278

SUMMARY OF INVENTION

In a typical seat device, a direction of a load applied to S springs from a seat cushion in a state where a person sits normally on the seat is a direction perpendicular to an S spring plane on which the respective S springs are located. This S spring plane is an imaginary plane. Therefore, the load-detecting device engaged with the S spring is configured to properly detect a load due to sitting when the load-detecting device is pressed by the seat cushion in a direction perpendicular to the S spring plane. Meanwhile, normal sitting means sitting of a person with his/her buttock located backmost side of the seat surface and his/her back being in contact with the backrest. However, a sitting person may front-side sit, that is, a sitting person may sit on the front side comparing to the normal sitting, or a sitting person may side-shift sit, that is, a sitting person may sit in a state where the sitting person is shifted in the lateral direction from the normal sitting. In such a case, the lower surface of the seat cushion tends to be inclined with respect to the S spring plane. In addition, the balance of the load applied to the seat cushion may be lost due to sitting holding luggage and other causes, and the lower surface of the seat cushion may be inclined with respect to the S spring plane. In these cases, the lower surface of the seat cushion also tends to be inclined with respect to the pressed surface of the load-detecting device that detects a load due to sitting by being pressed by the seat cushion.

Regarding the load-detecting device, when the lower surface of the seat cushion and the pressed surface of the load-detecting device are inclined with respect to each other as described above, there is a concern that a load due to sitting or the like may not be properly detected.

Therefore, an object of the present invention is to provide a load-detecting device capable of properly detecting a load.

In order to achieve the above-described object, the invention is a load-detecting device including a load detection sensor unit including a pressed surface configured to be pressed by a seat cushion and a pair of electrodes, the electrodes being brought into contact with each other when the pressed surface is pressed, and a base including a mount surface on which the load detection sensor unit is mounted, wherein the entire pressed surface moves with respect to the mount surface such that an angle of the entire pressed surface with respect to the mount surface changes.

According to a load-detecting device of this structure, an angle of the entire pressed surface to be pressed by the seat cushion with respect to the mount surface changes. Accordingly, even when the lower surface of the seat cushion is inclined, the pressed surface can follow the inclination. Therefore, the pressed surface is properly pressed by the lower surface of the seat cushion, and a load can be properly detected. This load-detecting device may be disposed under a seat cushion of the seat device to detect a load due to sitting. This load detection device may detect a load applied to various seat cushions. For example, the load detection device may be disposed under a seat cushion of the seat device to detect a load due to sitting or may be disposed under a seat cushion of a nursing care bed to detect a load due to lying.

The seat cushion may be a seat cushion in a seat device, and an amount of change in the angle in a front and back direction of the seat device is preferably larger than an amount of change in the angle in a right and left direction of the seat device.

Meanwhile, individual differences of sitting positions between sitting persons are generally larger in the front and back direction than in the right and left direction. Therefore, the angle of the lower surface of the seat cushion tends to change largely in the front and back direction than in the right and left direction. Accordingly, when the load-detecting device is used in the seat device, the amount of change in the angle between the pressed surface and the mount surface is larger in the front and back direction than in the right and left direction of the seat device. Thus, the pressed surface can follow the inclination of the lower surface of the seat cushion. Therefore, a load due to sitting can be detected more properly. It is to be noted that a load-detecting device structured such that an angle of the pressed surface with respect to the mount surface does not change in the right and left direction but changes in the front and back direction also satisfies the above-described structure.

It is preferable that the load detection sensor unit include a shaft part that is integrated with the pressed surface and extends from the pressed surface side toward the mount surface side, and the entire pressed surface be configured to pivot with a tip of the shaft part as a center.

Since the entire pressed surface is configured to pivot with the tip of the shaft part as the center, the angle of the pressed surface can be properly changed while simplifying the structure of the load detection sensor unit. In addition, since the shaft part extends toward the mount surface side and the pressed surface pivots with the tip of the shaft part as the center, the shaft part does not receive a load directly and the pressed surface of the load detection sensor unit receives pressing force. Thus, the pressed surface can pivot while friction between the bottom surface of the seat cushion and the pressed surface of the load detection sensor unit is suppressed. When a load is applied to the seat cushion, the bottom surface of the seat cushion displaces a little toward the center of the load. At this time, the bottom surface of the seat cushion displaces while being in contact with the load detection sensor unit. At that time, since the pressed surface pivots with the tip of the shaft part as the center, the force applied to the load detection sensor unit can be released and durability can be improved.

In this case, the shaft part preferably presses one of the electrodes in pair with the tip.

When the shaft part also serves as a pressing part configured to press the electrode, increase in the number of parts can be suppressed.

Alternatively, it is preferable that the load detection sensor unit include a shaft part configured to press one of the electrodes in pair on the base side, and the entire pressed surface be configured to pivot with a tip of the shaft part as a center.

In this case, pressing of the pressed surface causes the shaft part to press the electrode from the lower side. The pressed surface then pivots together with the electrode with the tip of the shaft part as the center, so that the pressed surface follows the inclination of the seat cushion.

It is preferable that the load detection sensor unit further include a spacer having an opening formed therein and electrode sheets in pair provided on respective sides of the spacer, the electrodes in pair be respectively provided on surfaces of the electrode sheets in pair and face each other through the opening, the surfaces being on the spacer side, and an electrode sheet on the shaft part side of the electrode sheets in pair include a metal plate at a position aligned with at least a part where the pair of electrodes is provided.

In the load-detecting device including the load detection sensor unit as described above, when the lower surface of the seat cushion moves downward to press the pressed surface, the pressing force causes the shaft part to press the metal plate. Because the metal plate is pressed as described above, the metal plate bends to press one of the electrodes on the side where the metal plate is disposed, and the one of the electrodes comes into contact with the other of the electrodes to turn on the switch. Sitting is detected in this way. Meanwhile, the flexibility of metal does not change so much even when the temperature changes. Therefore, even when the environmental temperature around the load-detecting device changes, the manner of bending of the metal plate to be pressed by the shaft part does not change so much. Therefore, according to this load-detecting device, erroneous detection of sitting or the like can be suppressed even when the environmental temperature changes. In addition, since the shaft part presses a part of the metal plate, the metal plate can be properly bent, and the sitting or the like can be properly detected. In addition, creep hardly occurs in metal compared with in resin, and thus a pressing mark is hardly made on the metal plate even when a part of the metal plate is pressed by the shaft part. Therefore, according to the load-detecting device including the load detection sensor unit structured as described above, it is possible to properly detect sitting or the like while suppressing erroneous detection of sitting or the like due to a pressing mark or the like.

In this case, it is preferable that the electrode sheet on the shaft part side of the electrode sheets in pair be made of the metal plate, and the metal plate serve as at least a part of the electrode on the electrode sheet on the shaft part side.

Since the metal plate also serves as an electrode as described above, sitting can be properly detected while suppressing the number of parts.

Alternatively, the electrode sheet on the shaft part side of the electrode sheets in pair may include an insulating sheet and the metal plate that is disposed on a surface on the shaft part side of the insulating sheet.

The seat cushion may be a seat cushion in a seat device, and the amount of change in an angle in a front and back direction of the seat device is preferably 5 degrees or less.

Because the amount of change in the angle of the lower surface of the seat cushion due to front-side sitting is 5 degrees or less, the meaning of making the change amount of the angle formed by the pressed surface and the mount surface in the front and back direction larger than 5 degrees is diluted. In addition, as the angle increases, strength deterioration of the load-detecting device is concerned. Therefore, by making an amount of change in the angle between the pressed surface and the mount surface 5 degrees or less, the pressed surface can follow the change of the lower surface of the seat cushion while maintaining strength of the load-detecting device.

The amount of change in the angle in the front and back direction of the seat device is preferably 0.5 degrees or more.

In the case of normal sitting, the change in the inclination angle of the lower surface of the seat cushion is less than 0.5 degrees at most. That is, when the change in the inclination angle of the lower surface of the seat cushion is 0.5 degrees or more, there is a high possibility that a person sitting on the seat device front-side sits. Therefore, by making an amount of change in the angle of the seat device between the pressed surface and the mount surface 0.5 degrees or more, the pressed surface can follow the inclination of the lower surface of the seat cushion even when a sitting person sits in a manner other than normal sitting.

As described above, according to the present invention, there is provided a load-detecting device capable of properly detecting a load.

DESCRIPTION OF EMBODIMENTS

Hereinafter, preferred embodiments of a load-detecting device according to the present invention will be described in detail with reference to the drawings. For ease of understanding, the scale of respective drawings may be different from the scale described in the following description.

First Embodiment

Figure 1:
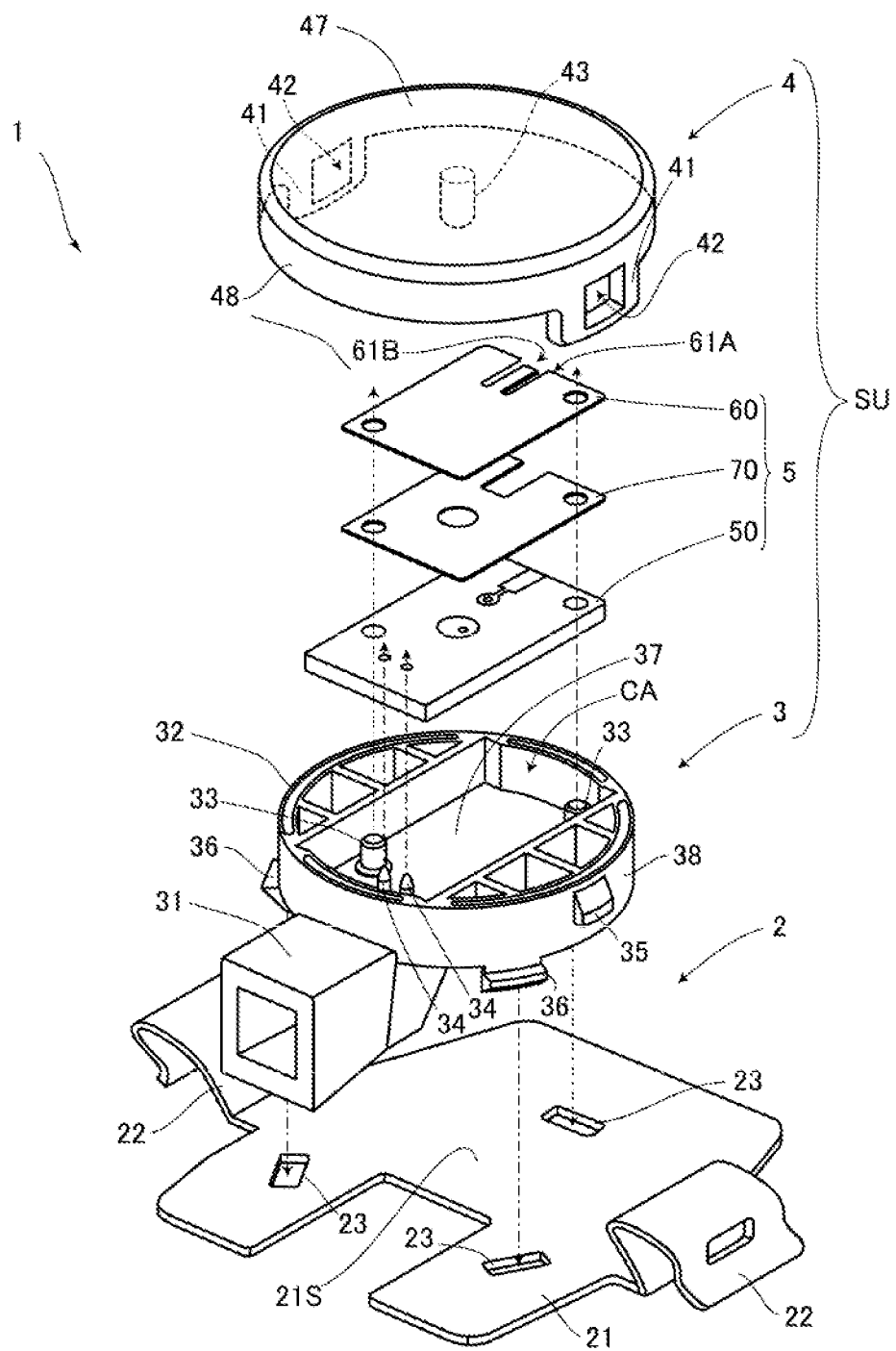
FIG. 1 is an exploded view illustrating a structure of a load-detecting device according to a first embodiment of a first embodiment.
Figure 2:
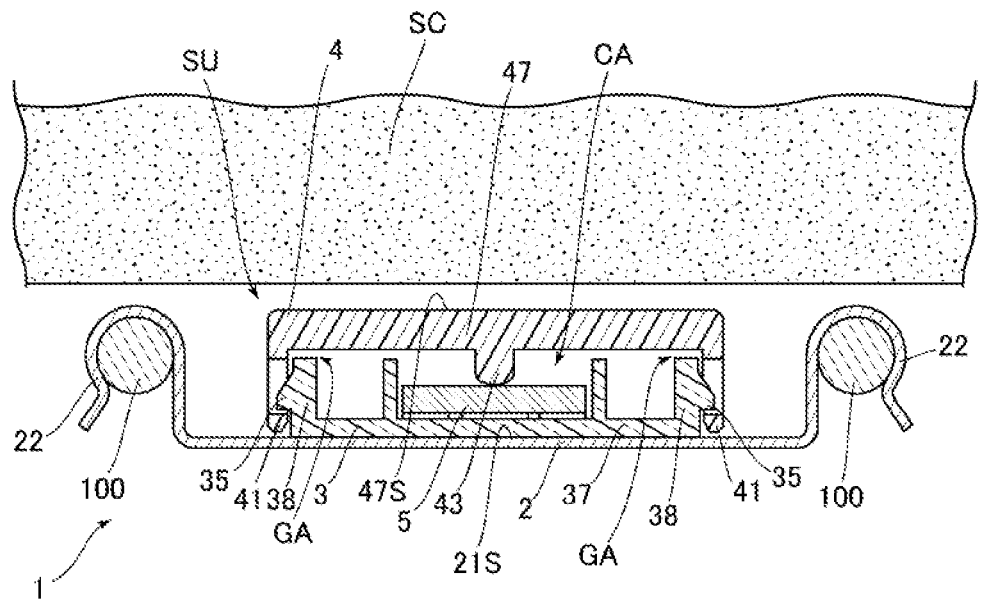
FIG. 2 is a cross sectional view illustrating the load-detecting device of FIG. 1 mounted on S springs.

FIG. 1 is an exploded view illustrating a structure of a load-detecting device according to the present embodiment, and FIG. 2 is a cross sectional view illustrating the load-detecting device 1 mounted on S springs of a seat device. FIG. 2 is a cross sectional view of the load-detecting device 1 in a plane along a right and left direction of the seat device. As illustrated in FIGS. 1 and 2, the load-detecting device 1 mainly includes a base 2 and a load detection sensor unit SU mounted on the base 2. In the present embodiment, a case where the load-detecting device 1 is a sitting detection device will be described.

The base 2 includes a mount part 21 on which the load detection sensor unit SU is mounted and a pair of hook parts 22 linked to the mount part 21. The upper surface of the mount part 21 serves as a mount surface 21S on which the load detection sensor unit SU is mounted. In addition, a plurality of through holes 23 penetrating the mount part 21 from the mount surface 21S to a lower surface (the surface opposite to the mount surface 21S) of the mount part 21 is formed in the mount part 21. The base 2 is, for example, formed by shaping a metal plate, and in this case, the plate thickness is set to 0.8 mm, for example.

The hook parts 22 in pair are respectively provided at positions opposed to each other with the mount part 21 between them, and are fitted on a pair of adjacent S springs 100 among the plurality of S springs 100 extending across an opening of a frame in the seat device of a vehicle. Therefore, each of the hook parts 22 is an engagement part for engaging the base 2 with the S springs 100. In the present embodiment, the hook parts 22 in pair are arranged in a lateral direction of the seat device and are formed so as to be fitted on the pair of S springs 100 adjacent in the lateral direction. In addition, in a state where the pair of hook parts 22 is fitted on the pair of adjacent S springs 100 in this manner, the mount part 21 is located below the seat cushion SC placed on the plurality of S springs 100, and the mount part 21 is located between the pair of S springs 100 when the plurality of S springs are viewed from above. In the state where the pair of hook parts 22 is fitted on the pair of S springs 100 as described above, the mount surface 21S is located lower than lower ends 102 of the respective S springs 100 in the present embodiment.

As illustrated in FIG. 1, the load detection sensor unit SU mainly includes a housing 3, a housing cover 4, and a load detection sensor 5.

As illustrated in FIGS. 1 and 2, the housing 3 includes a connector part 31 connected to a vehicle control unit (not illustrated) and a switch housing part 32 linked to the connector part 31. The switch housing part 32 includes a bottom wall 37 and a frame wall 38, and the bottom wall 37 and the frame wall 38 form a housing space CA for housing the load detection sensor 5. In the present embodiment, the frame wall 38 is lightened to suppress deformation during resin molding.

A pair of fixing pins 33 and a pair of connecting pins 34 are provided on the bottom wall 37 of the switch housing part 32. The fixing pins 33 in pair are pins each for fixing the load detection sensor 5 housed in the housing 3. The connecting pins 34 in pair are electrically connected to connector terminals of the connector part 31 and are electrically connected to the load detection sensor 5. Thus, the connecting pins 34 are pins each for electrically connecting the connector terminals and the load detection sensor 5. In FIG. 1, the connector terminal of the connector part 31 is not illustrated.

A pair of projecting pieces 35 is provided on the outer surface of the frame wall 38 of the switch housing part 32. In the present embodiment, the projecting pieces 35 in pair are provided so as to be arranged in the lateral direction of the seat. A plurality of hook pieces 36 is provided at a lower end of the frame wall 38. The hook pieces 36 are fitted into the respective through holes 23 of the base 2. The housing 3 is fixed to the base 2 by the respective hook pieces 36 fitted into the respective through holes 23 of the base 2, whereby the load detection sensor unit SU is mounted on the mount surface 21S of the base 2 as described above.

The housing cover 4 is a lid member that covers the housing space CA of the switch housing part 32, and has a top wall 47 and a frame wall 48. A pair of arms 41 is provided at the lower end of the frame wall 48 of the housing cover 4. Each of the arms 41 is formed with an opening 42 into which each of the projecting pieces 35 provided on the frame wall 38 of the switch housing part 32 of the housing 3 is fitted. When the projecting pieces 35 of the housing 3 are fitted into the respective openings 42 of the pair of arms 41, the housing cover 4 is engaged with the housing 3. Accordingly, in a state where the housing cover 4 is engaged with the housing 3, the arms 41 in pair sandwich the housing 3 in the lateral direction of the seat.

On the top wall 47 of the housing cover 4, there is provided a switch pressing part 43 projecting from an inner surface facing the bottom wall 37 of the switch housing part 32 of the housing 3. The switch pressing part 43 has a convex curved shape at its tip, and in a state where the housing cover 4 covers the housing 3 and the respective projecting pieces 35 are fitted into the respective openings 42, the tip is in contact with a switch of the load detection sensor 5. Examples of the material of the housing cover 4 include resins such as polycarbonate (PC), polyamide (PA), polybutylene terephthalate (PBT), phenol resin, epoxy resin and the like.

As illustrated in FIG. 2, the top wall 47 of the housing cover 4 and the frame wall 38 of the housing 3 are separated from each other to form a gap GA in such a state where the switch pressing part 43 of the housing cover 4 is in contact with the load detection sensor 5.

In a state where the load-detecting device 1 assembled in this way is mounted on the pair of S springs 100, an upper surface 47S of the top wall 47 of the housing cover 4 faces the lower surface of the seat cushion SC with a predetermined distance from the seat cushion. This upper surface 47S is planar. The upper surface 47S is a surface to be pressed by the seat cushion SC and can be considered as a pressed surface of the load-detecting device 1.

Figure 3:
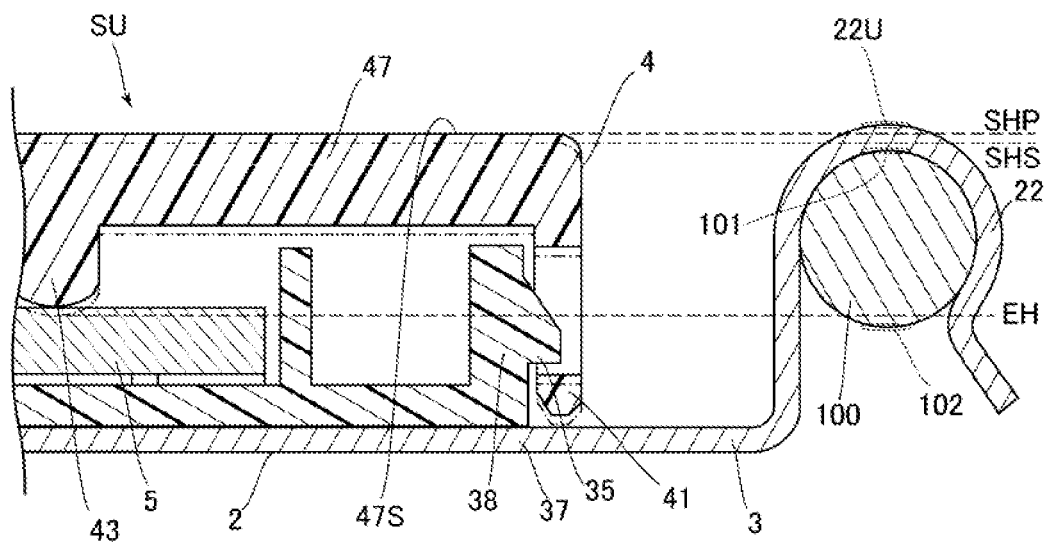
FIG. 3 is a partially enlarged view of FIG. 2.

FIG. 3 is a partial enlarged view of FIG. 2. As illustrated in FIG. 3, the upper surface 47S is located at a position higher than upper ends 101 of the S springs 100 as indicated by a broken line SHP, and in the present embodiment, the upper surface 47S is located at a position lower than the upper ends 22U of the hook parts 22, which are engagement parts, in a state where the upper surface 47S is not pressed, that is, a load due to sitting is not detected.

Note that a lower surface of the seat cushion SC is planar as illustrated in FIG. 2 in a state where the seat device is not used and the S springs 100 and the hook parts 22 are not marked on the lower surface of the seat cushion SC. On the other hand, the lower surface of the seat cushion SC is not planar in a state where the seat device is used and the S springs 100 and the hook parts 22 are marked on the lower surface of the seat cushion SC. Also in this case, an average height position of the lower surface of the seat cushion SC when a load due to sitting is not detected is located higher than the upper surface 47S of the housing cover 4. Therefore, it is possible to suppress unnecessary pressing of the upper surface 47S of the housing cover 4 by the lower surface of the seat cushion SC.

Figure 4:
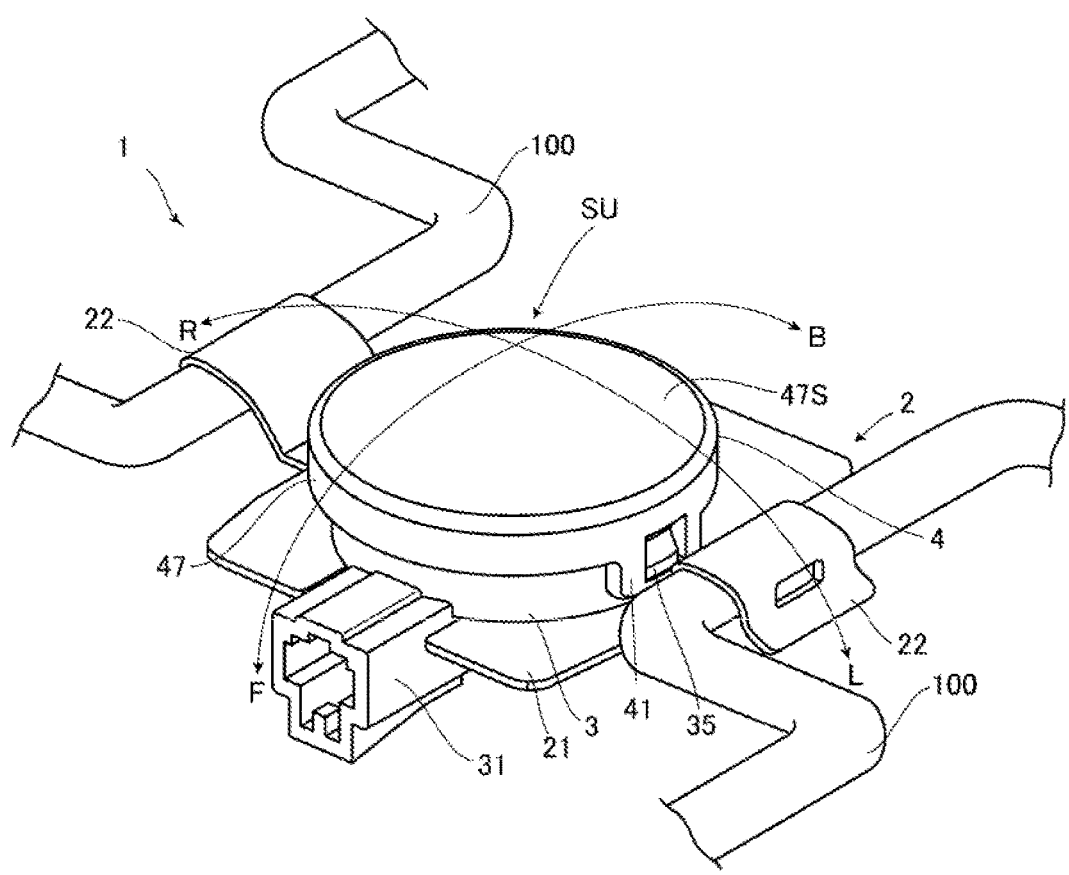
FIG. 4 is a perspective view illustrating the load-detecting device of FIG. 1 mounted on the S springs.
Figure 5:
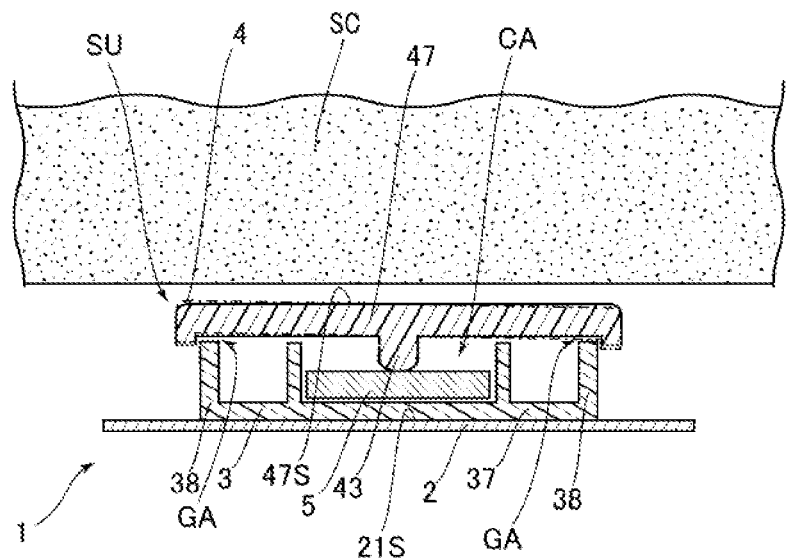
FIG. 5 is a cross sectional view of the load-detecting device of FIG. 1 on a plane along the front and back direction of a seat device.

FIG. 4 is a perspective view illustrating the load-detecting device 1 mounted on the S springs 100. FIG. 5 is a cross sectional view of the load-detecting device 1 along a front and back direction of the seat device. In FIG. 5, for ease of understanding, some members including members lower than the connector part 31 and the base 2 are not illustrated. As described above, the gap GA is formed between the top wall 47 of the housing cover 4 and the frame wall 38 of the housing 3 in a state where the tip of the switch pressing part 43 of the housing cover 4 is in contact with the load detection sensor 5. Therefore, the housing cover 4 can pivot in the F-B direction (front and back direction) indicated by an arrow in FIG. 4 so as to be inclined with the tip of the switch pressing part 43, which is a shaft part, as the center. In FIG. 5, inclination of the housing cover 4 in this manner is indicated by a one-dot chain line. Although not illustrated in FIG. 2 or FIG. 3, the housing cover 4 can also pivot in the R-L direction indicated by an arrow in FIG. 4 so as to be inclined with the tip of the switch pressing part 43, which is a shaft part, as the center. That is, the entire upper surface 47S of the housing cover 4 is inclined with respect to the mount surface 21S in the front and back direction and in the right and left direction so as to change an angle of the upper surface 47S with respect to the mount surface 21S when viewed along the direction of the mount surface 21S of the base 2. However, since the arms 41 in pair of the housing cover 4 sandwich the housing 3 in the lateral direction of the seat device as described above, the angle by which the housing cover 4 pivots is larger in the front and back direction than in the right and left direction of the seat. Since the upper surface 47S is not divided, the entire upper surface 47S moves.

Figure 6:
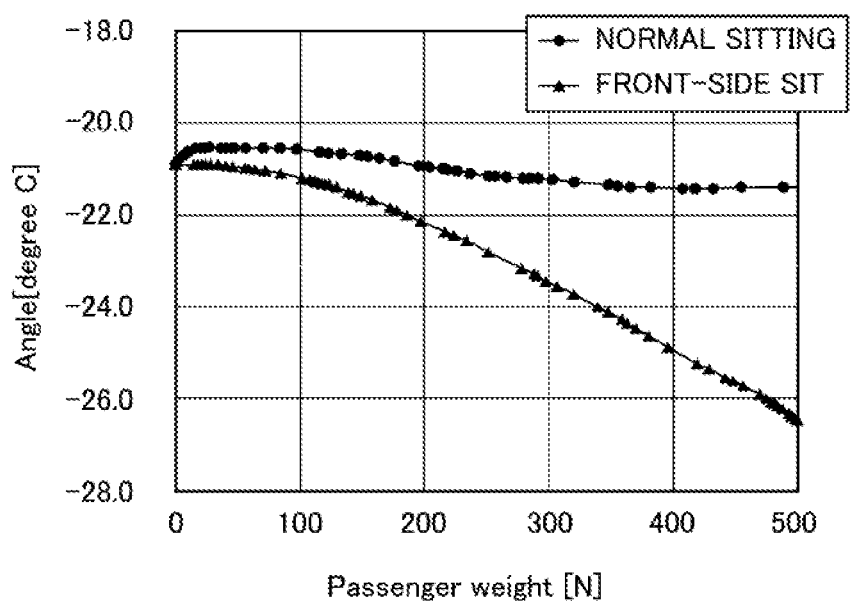
FIG. 6 is a diagram that illustrates the relationship between a load and an angle of a lower surface of a seat cushion with respect to the horizontal plane in cases where a person sitting on the seat device sits normally and a person front-side sits.

FIG. 6 is a diagram that illustrates the relationship between a load and an angle of the lower surface of the seat cushion with respect to the horizontal plane in cases where a person sitting on the seat device sits normally and a person front-side sits. As illustrated in FIG. 6, in the case of normal sitting, the angle of the lower surface of the seat cushion changes by 0.5 degrees or less to the front side or the back side from the initial state when a load is up to 500 N. It is considered that this tendency is not changed even if the load exceeds 500 N as long as a person sits normally. However, in the case of the front-side sitting, the angle of the lower surface of the seat cushion changes by about 5 degrees relative to the initial state when a load is up to 500 N. In addition, when the housing cover 4 pivots by more than 5 degrees from the initial state, strength deterioration of the load-detecting device 1 such as deformation of the switch pressing part 43 is concerned. Accordingly, it is preferable that the pivot angle of the housing cover 4 be set to 5 degrees or less. Therefore, it is preferable that the upper surface 47S of the housing cover 4 also pivot by 5 degrees or less. In normal sitting, as described above, the angle of the lower surface of the cushion sheet changes in a range less than 0.5 degrees to the front side or back side from the initial state. Accordingly, when the change in the inclination angle of the lower surface of the seat cushion is 0.5 degrees or more, there is a high possibility that a person sitting on the seat device front-side sits. Therefore, by pivoting the upper surface 47S of the housing cover 4 by an angle of 0.5 degrees or more from the initial state, the upper surface 47S can be inclined corresponding to at least part of change in the inclination angle of the lower surface of the seat cushion due to at least the front-side sit.

Next, the load detection sensor 5 housed in the switch housing part 32 of the housing 3 will be described.

Figure 7:
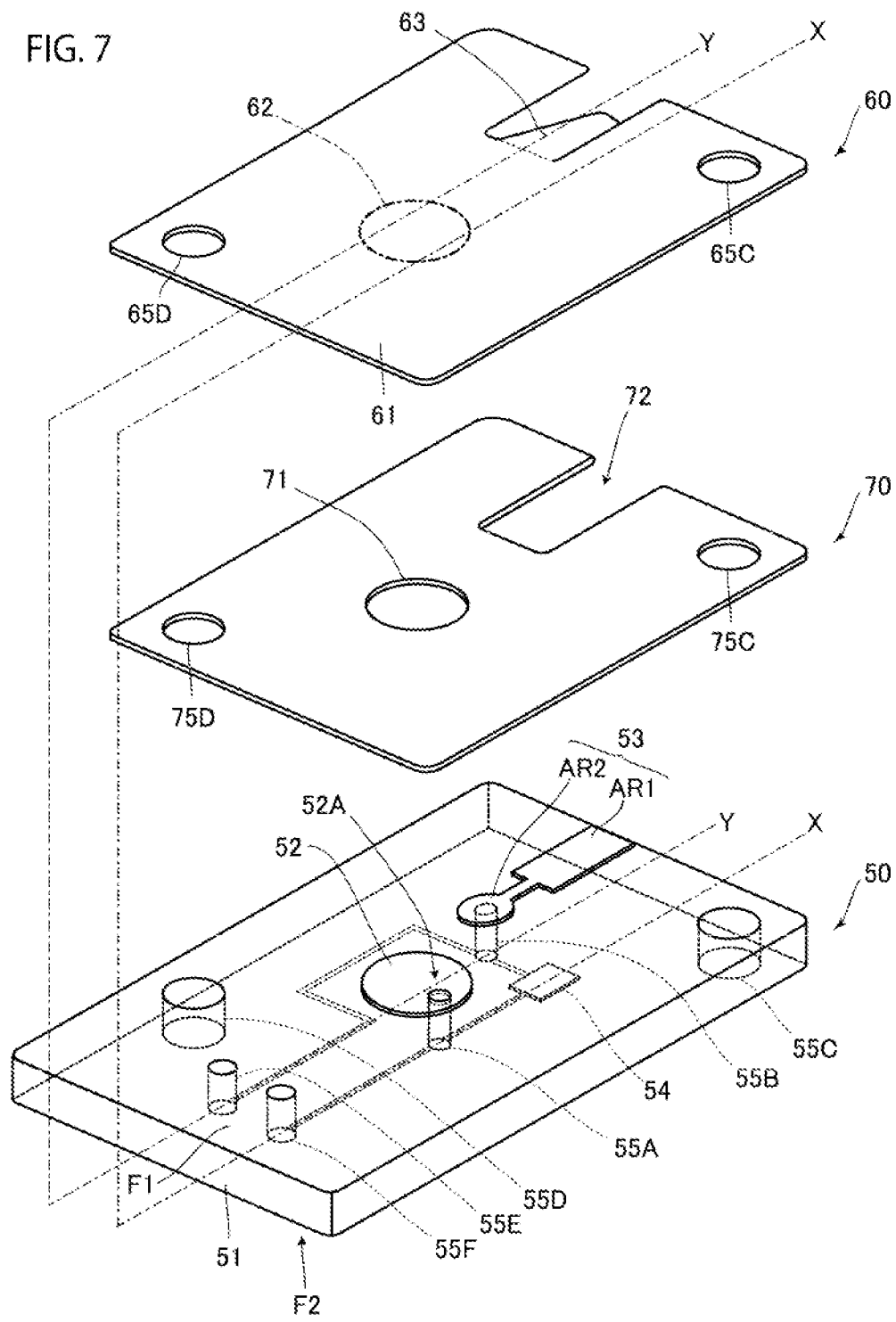
FIG. 7 is an exploded view illustrating a structure of the load detection sensor of FIG. 1.
Figure 8:
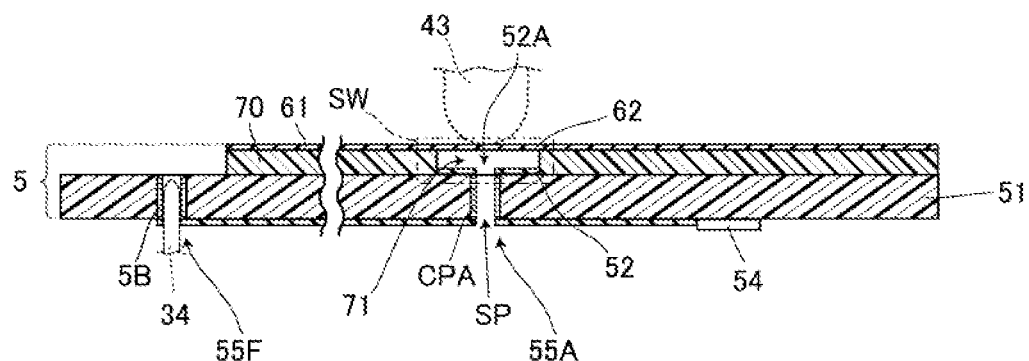
FIG. 8 is a cross sectional view of the load detection sensor taken along the line X-X illustrated in FIG. 7.

FIG. 7 is an exploded view illustrating a structure of the load detection sensor 5. FIG. 8 is a cross sectional view of the load detection sensor 5 taken along the line X-X illustrated in FIG. 7, and FIG. 9 is a cross sectional view of the load detection sensor 5 taken along the line Y-Y illustrated in FIG. 7.

Figure 9:
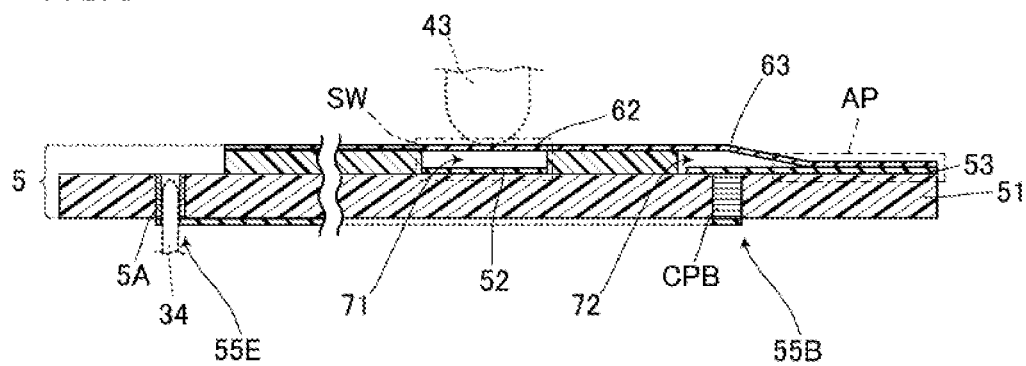
FIG. 9 is a cross sectional view of the load detection sensor taken along the line Y-Y illustrated in FIG. 7.

As illustrated in FIGS. 7 to 9, the load detection sensor 5 mainly includes a first electrode sheet 50, a second electrode sheet 60, and a spacer 70.

The first electrode sheet 50 includes, for example, an insulating substrate 51 having no flexibility. Examples of the material of the substrate 51 include phenol resin, epoxy resin and the like. On this substrate 51, a first electrode 52 and a first contact part 53 are disposed on one surface F1 facing the second electrode sheet 60.

The first electrode 52 is one of electrodes constituting a switch SW and is, for example, a circular metal printed layer. The first contact part 53 includes a substantially rectangular contact region AR1 that is in contact with the second electrode sheet 60 and a non-contact region AR2 that is not in contact with the second electrode sheet 60, and the regions are connected to each other.

The other surface F2 of the substrate 51 on the side opposite to the one surface F1 is a lower surface of the load detection sensor 5, and a resistor 54 is disposed on the other surface F2. The resistor 54 is a resistor for detecting disconnection, and in the present embodiment, the resistor 54 is constituted of a chip resistor.

A plurality of through holes penetrating from the one surface F1 to the other surface F2 of the substrate 51 are formed in the substrate 51, and are respectively referred to as a first sheet through hole 55A, a second sheet through hole 55B, fixing through holes 55C and 55D and pin through holes 55E and 55F.

The first sheet through hole 55A is a sheet through hole of which an opening is located in a region of the one surface F1 of the substrate 51 where the first electrode 52 is disposed. A first conductive member CPA is provided in the first sheet through hole 55A, and through the first conductive member CPA, a circuit part disposed on the other surface F2 of the substrate 51 and the first electrode 52 are electrically connected to each other. Accordingly, the first conductive member CPA and the resistor 54 are electrically connected, and as a result, the first electrode 52 and the resistor 54 are electrically connected. The first conductive member CPA is provided on the inner peripheral surface of the first sheet through hole 55A, and in the first sheet through hole 55A, an air hole SP surrounded by the first conductive member CPA is formed.

The second sheet through hole 55B is a sheet through hole of which an opening is located in a region of the one surface F1 of the substrate 51 where the first contact part 53 is disposed. In the present embodiment, the opening of the second sheet through hole 55B is located in the non-contact region AR2 of the first contact part 53.

The second sheet through hole 55B is filled with a second conductive member CPB. The circuit part disposed on the other surface F2 of the substrate 51 and the non-contact region AR2 of the first contact part 53 are electrically connected through the second conductive member CPB. On the other surface F2 of the substrate 51, the second conductive member CPB is connected to the resistor 54. Accordingly, the resistor 54 and the first contact part 53 are electrically connected. Since the first electrode 52 and the resistor 54 are electrically connected as described above, the first electrode 52, the resistor 54, and the first contact part 53 are electrically connected in series in this order.

The fixing through holes 55C and 55D are through holes through which the pair of fixing pins 33 provided on the bottom wall 37 of the switch housing part of the housing 3 is inserted. The diameter of the fixing through holes 55C and 55D have a diameter that is approximately the same as the outer diameter of the pair of fixing pins 33.

The pin through holes 55E and 55F are through holes through which the pair of connecting pins 34 provided on the housing 3 is inserted. Inside of the pin through hole 55E, a terminal 5A that is one end part of the electric circuit of the load detection sensor 5 is provided, and inside the pin through hole 55F, a terminal 5B that is the other end part of the electric circuit of the load detection sensor 5 is provided. The terminal 5A is electrically connected to a contact point between the first electrode 52 and the resistor 54, and the terminal 5B is electrically connected to a contact part between the resistor 54 and the first contact part 53. The terminals 5A and 5B are provided along the inner peripheral surfaces of the corresponding pin through holes 55E and 55F. The width of a space surrounded by the terminals 5A and 5B is approximately the same as the outer diameter of the connecting pins 34. When the pair of connecting pins 34 is inserted through the pin through holes 55E and 55F, the terminal 5A and the one connecting pin 34 are electrically connected, and the terminal 5B and the other connecting pin 34 are electrically connected.

The second electrode sheet 60 mainly includes a metal sheet 61, a second electrode 62, and a second contact part 63.

The metal sheet 61 is a thin metal plate having flexibility, and in the present embodiment, the metal sheet 61 has a thin rectangular parallelepiped shape having a longitudinal width smaller than the longitudinal width of the substrate 51 and a lateral width that is approximately the same as the lateral width of the substrate 51. The material of the metal sheet 61 is not particularly limited as long as it is a metal, but examples of the material include copper, stainless steel and the like.

In the metal sheet 61, fixing through holes 65C and 65D penetrating from one surface to the other surface of the metal sheet 61 are formed. The fixing through holes 65C and 65D are through holes through which the pair of fixing pins 33 provided on the bottom wall of the switch housing part of the housing 3 is inserted, and have the same shape and size as those of the fixing through holes 55C and 55D formed in the substrate 51 of the first electrode sheet 50. The positional relationship of parts where the second electrode 62 and the second contact part 63 are disposed with respect to the fixing through holes 65C and 65D and the positional relationship of parts where the first electrode 52 and the first contact part 53 are located with respect to the fixing through holes 55C and 55D in the first electrode sheet 50 are relatively the same. When the first electrode sheet 50 and the metal sheet 61 are stacked on each other, the fixing through hole 55C and the fixing through hole 65C are aligned with each other and the fixing through hole 55D and the fixing through hole 65D are aligned with each other.

The second electrode 62 is the other electrode of the electrodes constituting the switch SW, and in the present embodiment, the second electrode 62 is a part that is on the metal sheet 61 made of a metal plate and faces the first electrode 52 with the spacer 70 between them. That is, a part of the metal sheet 61 also serves as the second electrode 62. For example, a metal layer made of the same material as or a different material from that of the metal sheet 61 may be disposed as a second electrode 62 at a part opposed to the first electrode 52 with the spacer 70 between them on the metal sheet 61.

The second contact part 63 is one of members constituting a connection maintaining part AP, and in the present embodiment, the second contact part 63 is formed as a plate spring. That is, a pair of cutouts 61A and 61B (FIG. 1) extending from one end toward the other end of the metal sheet 61 is formed in the metal sheet 61 with a predetermined gap between the cutouts 61A and 61B. A part between the cutouts 61A and 61B (FIG. 1) serves as the second contact part 63. In addition, the root of the second contact part 63 is bent toward the first electrode sheet 50 so that the second contact part 63 is inclined with respect to the sheet surface of the metal sheet 61, whereby the second contact part 63 is formed as a plate spring. As described above, on the metal sheet 61, a part different from the part serving as the second electrode 62 serves as the second contact part 63. The position where the second contact part 63 is formed is a position aligned with the contact region AR1 of the first contact part 53 when the first electrode sheet 50 and the second electrode sheet 60 are stacked on each other. The shape of the plate spring formed as the second contact part 63 may be, for example, a trapezoidal shape having a width at the root larger than the width at the open end, and may be various shapes other than the rectangle or the trapezoid. A metal layer of the same material as or a different material from that of the metal sheet 61 may be disposed on the first electrode sheet 50 side of the metal sheet 61 as the second contact part 63.

The spacer 70 is a thin insulating member sandwiched between the first electrode sheet 50 and the second electrode sheet 60. In the present embodiment, the spacer 70 has substantially the same shape and size as those of the metal sheet 61 after elimination of the second contact part 63. Examples of the material of the spacer 70 include resins such as polyethylene terephthalate (PET), polyimide (PI) and polyethylene naphthalate (PEN).

An opening 71 is formed in this spacer 70. The opening 71 is formed at a position that is between the first electrode 52 disposed on the substrate 51 and the second electrode 62 of the metal sheet 61 facing the first electrode 52, and is aligned with the first electrode 52 and the second electrode 62 in the vertical direction. The size of the opening 71 is slightly smaller than the size of the first electrode 52.

In addition, a slit-like opening 72 is formed in the spacer 70. The opening 72 is formed at a position that is between the first contact part 53 disposed on the substrate 51 and the second contact part 63 of the metal sheet 61 facing the first contact part 53, and is aligned with the first contact part 53 and the second contact part 63 in the vertical direction. The size of the opening 72 is slightly larger than the size of the plate spring formed as the second contact part 63 in the metal sheet 61.

Further, in the spacer 70, fixing through holes 75C and 75D penetrating from one surface to the other surface of the spacer 70 are formed. The fixing through holes 75C and 75D are through holes through which the fixing pins 33 provided on the bottom wall of the switch housing part of the housing 3 are inserted, and have the same shape and size as those of the fixing through holes 55C and 55D formed in the substrate 51 of the first electrode sheet 50. The positional relationship of parts where the opening 71 and the opening 72 are formed with respect to the fixing through holes 75C and 75D on the spacer 70 and the positional relationship of the first electrode 52 and the first contact part 53 with respect to the fixing through holes 55C and 55D in the first electrode sheet 50 are relatively the same. Therefore, when the first electrode sheet 50, the spacer 70, and the second electrode sheet 60 are stacked on each other, the fixing through hole 55C, the fixing through hole 65C, and the fixing through hole 75C are aligned with each other, and the fixing through hole 55D, the fixing through hole 65D, and the fixing through hole 75C are aligned with each other.

The first electrode sheet 50, the second electrode sheet 60, and the spacer 70 as described above are stacked to form the load detection sensor 5. In the load detection sensor 5, as illustrated in FIG. 8, the first electrode 52 and the second electrode 62 face each other through the opening 71 to form the switch SW. In a state where the first electrode 52 and the second electrode 62 are separated from each other, the distance between the first electrode 52 and the second electrode 62 is, for example, 0.1 mm. Then, an air hole SP formed in an electrode through hole 52A communicates with the opening 71. Therefore, when the second electrode 62 bends and comes to contact with the first electrode 52, unnecessary air can be discharged through the air hole SP to the outside of the load detection sensor 5. As described above, the first sheet through hole 55A serves not only as a hole for electrically connecting the first electrode 52 disposed on the one surface F1 of the substrate 51 and the circuit part disposed on the other surface F2 side but also as an exhaust hole for discharging air in the opening 71 to the outside of the load detection sensor 5.

As described above, in the load detection sensor 5, the second contact part 63 of the second electrode sheet 60 is formed as a plate spring, and thus is plastically deformed so that the second contact part 63 is always inclined with respect to the sheet surface of the metal sheet 61. Therefore, as illustrated in FIG. 9, the second contact part 63 passes through the opening 72 formed as a cutout in the spacer 70 and is connected to the contact region AR1 of the first contact part 53 of the first electrode sheet 50. As described above, the first contact part 53 and the second contact part 63 contact with each other to form the connection maintaining part AP. In other words, the first contact part 53 of the first electrode sheet 50 is one of members constituting the connection maintaining part AP, which maintains electric connection even when no external pressure is applied to the housing cover 4 of the load detection sensor unit SU, and the second contact part 63 of the second electrode sheet 60 is the other member constituting the connection maintaining part AP.

The pair of fixing pins 33 of the housing 3 are inserted through the fixing through holes 55C and 55D of the first electrode sheet 50, the fixing through holes 75C and 75D of the spacer 70, and the fixing through holes 65C and 65D of the second electrode sheet 60 in this order as illustrated in FIG. 1, so that the load detection sensor 5 is fixed to the housing 3. At this time, the substrate 51 and the bottom wall 37 of the housing 3 are located between the first electrode 52 and the mount surface 21S of the base 2. Therefore, the substrate 51 and the bottom wall 37 can be considered as supporting members that support the first electrode 52 on the base 2 respectively. In a state where the load detection sensor 5 is fixed to the housing 3, and the housing 3 is mounted on the base 2 as the approximate heights of the first electrode 52 and the second electrode 62 are indicated by a broken line EH in FIG. 3, the first electrode 52 and the second electrode 62 are located at heights between the lower ends 102 and the upper ends 101 of the respective S springs 100, with which the base 2 is engaged.

Further, in a state where the load detection sensor 5 is fixed to the housing 3, the pair of connecting pins 34 is inserted into the pin through holes 55E and 55F of the first electrode sheet 50. As a result, the terminals 5A and 5B provided inside the pin through holes 55E and 55F come into contact with the corresponding connecting pins 34 and are electrically connected to the connector terminals of the connector part 31 of the housing 3 through the connecting pins 34. When the housing cover 4 is mounted, the tip of the switch pressing part 43 comes into contact with a side opposite to the first electrode 52 side of the second electrode 62 in the switch SW as described above.

Figure 10:
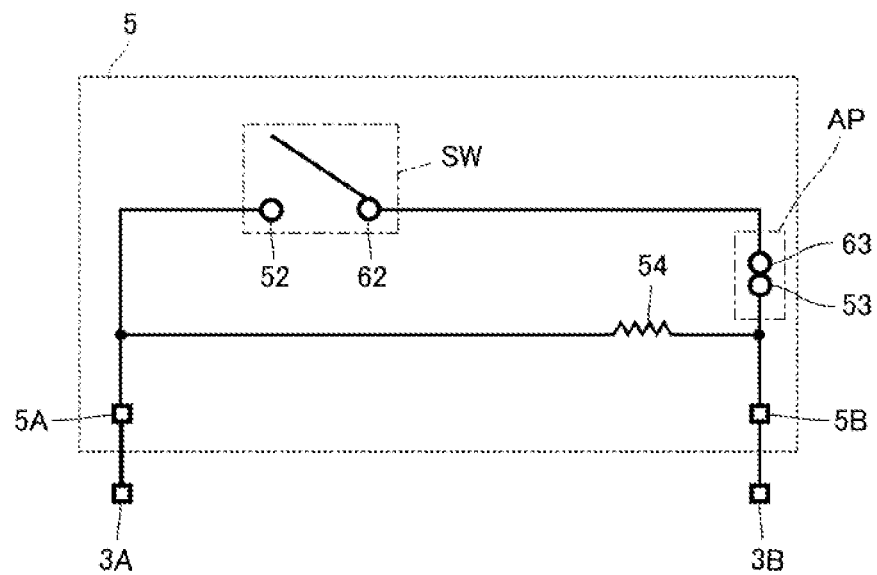
FIG. 10 is a diagram that illustrates an equivalent circuit of the load detection sensor of FIG. 7.

FIG. 10 is a diagram that illustrates an equivalent circuit of the load detection sensor 5 fixed to the housing 3. As illustrated in FIG. 10, the switch SW (the first electrode 52 and the second electrode 62) and the connection maintaining part AP (the first contact part 53 and the second contact part 63) are connected between the terminals 5A and 5B in pair that are circuit ends of the load detection sensor 5. The switch SW is electrically connected between the terminals 5A and 5B in pair and is connected to the connector terminals 3A and 3B provided on the connector part 31 of the housing 3 through the pair of terminals 5A and 5B. Since the resistor 54 is electrically connected to the first electrode 52 and the first contact part 53 as described above, the resistor 54 is connected to the switch SW electrically in parallel. Therefore, when the switch SW is turned on, the resistance value between the terminals 5A and 5B decreases from the resistance value when the switch SW is OFF.

Next, detection of a load will be described.

When a person sits on the seat device, the lower surface of the seat cushion SC moves downward due to the load of the person. At this time, the lower surface of the seat cushion SC may be inclined with respect to the S spring plane including the respective S springs 100 due to the load of the person. In the present embodiment, the lower surface of the seat cushion SC comes into contact with the upper ends 22U of the pair of hook parts 22. Accordingly, even if the lower surface of the seat cushion SC is inclined with respect to the S spring plane as described above, the upper ends 22U of the pair of hook parts 22 press the lower surface of the seat cushion SC, whereby inclination of the lower surface of the seat cushion SC can be suppressed to some extent.

When the lower surface of the seat cushion SC moves further downward, the lower surface of the seat cushion SC comes into contact with the upper surface 47S of the housing cover 4 while being deformed by being pressed against the upper ends 22U of the pair of hook parts 22. At this time, the lower surface of the seat cushion SC may be inclined to some extent even though the inclination is suppressed as described above. In this case, the lower surface of the seat cushion SC is also inclined with respect to the mount surface 21S of the base 2 engaged with the S springs 100, and thus also inclined with respect to the upper surface 47S of the housing cover 4 of the load detection sensor unit SU fixed on the mount surface 21S.

When the lower surface of the seat cushion SC moves further downward, the lower surface of the seat cushion SC presses the upper surface 47S of the housing cover 4. At this time, when the lower surface of the seat cushion SC is inclined with respect to the upper surface 47S of the housing cover 4 as described above, the housing cover 4 can pivot so as to be inclined with the tip of the switch pressing part 43, which is a shaft part in contact with the load detection sensor 5, as the center. Thus, the upper surface 47S moves so as to change the angle with respect to the mount surface 21S. Therefore, the upper surface 47S of the housing cover 4 can make surface contact with the lower surface of the seat cushion SC.

When the lower surface of the seat cushion SC moves further downward, the housing cover 4 moves downward within the gap GA since the gap GA is formed between the housing cover 4 and the housing 3 as described above.

Figure 11:
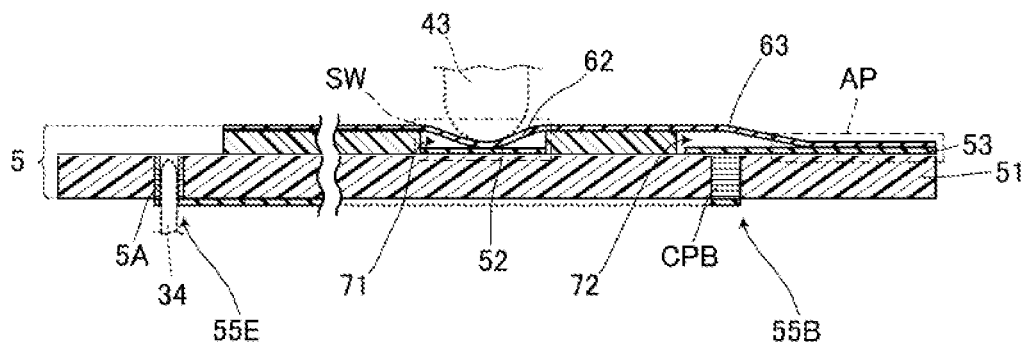
FIG. 11 is a view that illustrates an ON state of the load-detecting device of FIG. 7.

FIG. 11 is a view that illustrates an ON state of the load detection sensor 5. As a result of the downward movement of the housing cover 4, the tip of the switch pressing part 43 presses the second electrode 62, and as illustrated in FIG. 11, the second electrode 62 comes into contact with the first electrode 52, so that the switch SW of the load detection sensor 5 is turned on. Therefore, the resistance value between the terminals 5A and 5B in pair becomes low, and this change in the resistance value is detected by the vehicle control unit (not illustrated) through the connector terminals 3A and 3B. A load due to sitting is detected in this way.

Meanwhile, in FIG. 3, a state where the housing cover 4 moves downward as described above and a load is detected is indicated by a one-dot chain line. However, in order to avoid complications of the drawing, the state where the switch SW of the load detection sensor 5 is on is not illustrated in FIG. 3. Since the first electrode 52 is provided on the substrate 51 as described above, the first electrode 52 hardly bends. Therefore, the position of the contact surface between the first electrode 52 and the second electrode 62 when a load is detected substantially matches with the position of the surface of the first electrode 52 on the side of the second electrode 62 when a load is not detected. The height of the contact surface between the first electrode 52 and the second electrode 62 when a load is detected is the height of the broken line EH as illustrated in FIG. 3, and is located lower than the upper ends 101 of the respective S springs 100 and is located between the upper ends 101 and the lower ends 102.

When a load is detected, the upper surface 47S of the housing cover 4 of the load detection sensor unit SU is located at a position higher than the upper ends 101 of the respective S springs 100 with which the respective hook parts 22 of the base 2 are engaged as indicated by a broken line SHS in FIG. 3. In addition, at this time, the upper surface 47S of the housing cover 4 is located lower than the upper ends 22U of the respective hook parts 22 that are engaged with the respective S springs 100 of the base 2. As described above, in the present embodiment, the upper surface 47S of the housing cover 4 is located lower than the upper ends 22U of the hook parts 22 in a state where a load is not detected. Therefore, the housing cover 4 moves within the plate thickness at the upper ends 22U of the hook parts 22 during a stage of transition from a state where a load is not detected to a state where a load is detected. That is, a movement stroke of the upper surface 47S of the housing cover 4 is made smaller than the plate thickness of the upper ends 22U of the hook parts 22.

In the load-detecting device 1 of the present embodiment, the angle of the upper surface 47S of the housing cover 4, which is a pressed surface to be pressed by the seat cushion SC, with respect to the mount surface 21S of the base 2 changes as described above. Therefore, even the lower surface of the seat cushion SC lowers while changing the degree of inclination of the lower surface, the upper surface 47S can follow the inclination. Therefore, the upper surface 47S is properly brought into surface contact with the lower surface of the seat cushion SC and pressed by the lower surface. Therefore, according to the load-detecting device of the present embodiment, it is possible to properly detect a load.

In the load-detecting device 1 of the present embodiment, the housing cover 4 inclines larger in the front and back direction than in the right and left direction of the seat device. That is, the amount of change in the angle of the upper surface 47S of the housing cover 4 with respect to the mount surface 21S is larger in the front and back direction than in the right and left direction of the seat device. Meanwhile, individual differences of sitting positions between sitting persons are generally larger in the front and back direction than in the right and left direction. Therefore, the angle of the lower surface of the seat cushion tends to change largely in the front and back direction than in the right and left direction. However, since the amount of change in the angle between the upper surface 47S and the mount surface 21S is larger in the front and back direction than in the right and left direction of the seat device as described above, the upper surface 47S can follow the inclination of the lower surface of the seat cushion SC. Therefore, when the load-detecting device 1 is a sitting detection device in which a seat device is used as in the present embodiment, sitting can be more properly detected.

In the load-detecting device 1 of the present embodiment, the load detection sensor unit SU includes the switch pressing part 43, which is a shaft part that is integrated with the upper surface 47S of the housing cover 4 and extends from the upper surface 47S toward the mount surface 21S side of the base 2, and the upper surface 47S pivots as the tip of the switch pressing part 43 as the center. Therefore, the angle of the upper surface 47S of the housing cover 4 can be properly changed while simplifying the structure of the load detection sensor unit. In addition, since the switch pressing part 43, which is a shaft part, extends toward the mount surface 21S side of the base 2 and the upper surface 47S pivots with the tip of the switch pressing part 43 as the center, the switch pressing part 43 does not directly receive a load but the upper surface 47S, which is the pressed surface of the load detection sensor unit SU, receives pressing force. Thus, the switch pressing part 43 can pivot while friction between the bottom surface of the seat cushion SC and the upper surface 47S of the load detection sensor unit SU is suppressed. Further, in the load-detecting device 1 of the present embodiment, the switch pressing part 43, which is a shaft part, presses the second electrode 62 at the tip of the switch pressing part 43. That is, the shaft part also serves as a pressing part configured to press the electrode. Therefore, as compared with a case where a member configured to press the electrode and a shaft part are formed as separate members, the number of parts can be reduced and manufacturing cost can be reduced. In the above-described embodiment, the load-detecting device 1 is structured such that the tip of the switch pressing part 43 is in contact with the load detection sensor 5 even when a load is not detected. However, the load-detecting device 1 may be structured such that the tip of the switch pressing part 43 is not in contact with the load detection sensor 5 except when a load is detected.

The load-detecting device 1 of the present embodiment includes the base 2 engaged with a pair of S springs 100 and the load detection sensor unit SU. The load detection sensor unit SU includes the first electrode 52 and the second electrode that are electrodes in pair, that face each other, and that come to contact with each other due to pressing force of the seat cushion SC when a load is detected. The load detection sensor unit SU also includes a supporting member that supports the pair of electrodes on the base 2. The upper surface 47S which is a pressed surface of the load detection sensor unit SU pressed by the seat cushion SC when a load is detected is located at the same height as or higher than the upper ends 101 of the respective S springs 100, with which the base 2 is engaged, and the contact surface between the electrodes in pair is located lower than the upper ends 101 of the respective S springs 100, with which the base 2 is engaged.

The lower surface of the seat cushion SC disposed on the S springs 100 tends to deform larger locally at the hook parts 22 of the base 2 engaged with the S springs 100 than an area around the hook parts 22. However, even when the lower surface of the seat cushion SC is deformed as described above, a part of the lower surface of the seat cushion SC overlapping with the base 2 hardly bends downward to a position lower than the upper ends 101 of the S springs 100. Even when the part bends to a position lower than the upper ends 101 of the S springs 100, force of the lower surface of the seat cushion SC pressing the load-detecting device 1 is small. However, according to the load-detecting device 1 of the present embodiment, the upper surface 47S to be pressed by the seat cushion SC is located higher than the upper ends 101 of the S springs 100 as described above. Therefore, the upper surface 47S is properly pressed by the seat cushion SC and a load can be properly detected.

The contact surface between the electrodes in pair, which are the first electrode 52 and the second electrode 62, is located lower than the upper ends 101 of the S springs 100. Therefore, the supporting member such as the housing 3 and the substrate 51 that supports the pair of electrodes on the base 2 is also located lower than the upper ends 101 of the S springs 100. Force applied to the supporting member located lower than the upper ends 101 of the S springs 100 as described above is force that passes through a space between the upper ends 101 of the S springs 100 in pair, with which the base 2 is engaged, downward. Therefore, even when oblique force is applied from the lower surface of the seat cushion SC to the upper surface 47S of the housing cover 4 located higher than the upper ends 101 of the S springs 100, for example, force in a direction close to a direction perpendicular to the S spring plane consisted of respective S springs 100 is applied to supporting members located lower than the upper ends 101 of the S springs 100. Therefore, positional displacement and the like between supporting members located lower than the upper ends 101 of the S springs 100 can be suppressed. Therefore, the load-detecting device 1 of the present embodiment can suppress deterioration of detection accuracy.

In the load-detecting device 1 of the present embodiment, the first electrode 52 and the second electrode 62 are located between the lower ends 102 and the upper ends 101 of the respective S springs 100, with which the base 2 is engaged. Since the pair of electrodes is located at such a height position, even when some load is applied to a space below a seat pad, the S springs extending across the entire surface serve as a protective wall, and thus a load directly applied to the contact part can be reduced as much as possible. Therefore, problems such as positional displacement and the like of the contact part can be prevented.

In the load-detecting device 1 of the present embodiment, the mount surface 21S of the base 2, on which the load detection sensor unit SU is mounted, is located lower than the lower ends 102 of the respective S springs 100, with which the base 2 is engaged. Therefore, it is possible to suppress direct application of an oblique load applied from the upper side to the mount surface 21S of the base 2 and to a part in the vicinity of the mount surface 21S of the load detection sensor unit SU more effectively. The load-detecting device 1 is effective when used in a seat device, for example, when an excessively large load is applied locally, for example, in a case where an occupant rides on a seat surface with his/her whole weight on the knees compared with an assumed normal sitting. The mount surface 21S may be at the same height as the lower ends 102 of the S springs 100 though this is different from the above-described embodiment.

In addition, the upper surface 47S of the housing cover 4 is located lower than the upper ends 22U of the hook parts 22, with which the S springs 100 of the base 2 are engaged, when a load is not detected. Therefore, when a load is detected, the seat cushion SC bends downward to a position lower than the upper ends 22U of the hook parts 22 to press the upper surface 47S of the housing cover 4. Therefore, inclination of the seat cushion SC with respect to the S spring plane can be suppressed, and application of an excessive load on the upper surface 47S can be suppressed. Accordingly, durability of the load-detecting device 1 can be improved. Meanwhile, the upper surface 47S of the housing cover 4 when a load is not detected can be located at the same height as the upper ends 22U of the hook parts 22 though this is different from the present embodiment. Also in this case, application of an excessive load to the upper surface 47S can be suppressed, and the durability of the load-detecting device 1 can be improved. In addition, the amount of deformation from the time when the bottom surface of the seat cushion SC comes into contact with the load detection sensor unit SU until the load detection sensor unit SU detects the load can be extremely small. Therefore, the shape of the bottom surface of the seat cushion SC when a load is not applied is substantially the same as that when a load is applied, and high performance stability to deformation of the seat cushion SC due to aging, which is so-called deterioration, can be exhibited.

In the load detection sensor 5 of the present embodiment, the circuit part formed on the first electrode sheet 50 and the circuit part formed on the second electrode sheet 60 are always in a conductive state through the first contact part 53 of the first electrode sheet 50 and the second contact part 63 of the second electrode sheet 60. Therefore, each of the terminals 5A and 5B in pair can be disposed on the first electrode sheet 50. Accordingly, the load detection sensor 5 allowing a pair of terminals to be disposed on the first electrode sheet 50 is provided.

In the load detection sensor 5 of the present embodiment, a part of the second electrode sheet 60 including the second contact part 63 is formed as a plate spring configured to press the second contact part 63 against the first contact part 53. Therefore, an additional member for maintaining the first contact part 53 and the second contact part 63 always in a connected state can be made unnecessary. Accordingly, it is possible to suppress an increase in the number of parts and to reduce the size.

In the load detection sensor 5 of the present embodiment, the second electrode sheet 60, which is an electrode sheet on the switch pressing part 43 side, includes the metal sheet 61 made of a metal plate at a position aligned with the first electrode 52 and the second electrode 62. In addition, in the present embodiment, the metal sheet 61 also serves as the second electrode 62. In the load-detecting device 1 including the load detection sensor unit SU as described above, when the lower surface of the seat cushion SC moves downward to press the upper surface 47S of the housing cover, the pressing force causes the switch pressing part 43 to press the metal sheet 61. Because the metal sheet 61 is pressed as described above, the metal sheet 61 bends to press the second electrode, which is an electrode on the side where the metal sheet 61 is disposed, and the second electrode comes into contact with the first electrode 52 to turn on the switch. Meanwhile, the flexibility of metal does not change so much even when the temperature changes. Therefore, the influence of heat on the second electrode sheet 60 is small, and thus the sensitivity of the load detection sensor 5 is stabilized and erroneous detection of sitting or the like can be suppressed even when the load detection sensor 5 is used in high temperature environment or low temperature environment. In addition, since the switch pressing part 43 presses a part of the metal sheet 61, the metal sheet 61 can be properly bent, and the sitting or the like can be properly detected. Further, creep hardly occurs in metal compared with in resin, and thus a pressing mark is hardly made on the metal sheet 61 even when a part of the metal sheet 61 is pressed by the switch pressing part 43. Therefore, according to the load-detecting device 1 of the present embodiment including the load detection sensor unit SU structured as described above, it is possible to properly detect sitting or the like while suppressing erroneous detection of sitting or the like due to a pressing mark or the like. In addition, since the second electrode sheet 60, which is an electrode sheet on the switch pressing part 43 side, is made of a metal plate and the metal plate serves as at least a part of the electrode, sitting can be properly detected while suppressing the number of parts. In addition, since the second electrode sheet 60 is made of metal, breakage or the like can be reduced and durability can be improved. Furthermore, since the second contact part 63, which is formed as a plate spring in the second electrode sheet 60, is also made of metal, malleability and ductility of the second contact part 63 formed as the plate spring can be increased compared with a case where a part of the resin sheet is formed as a plate spring. Therefore, damage such as breakage of the second contact part 63 formed as a plate spring can be reduced, and durability of the plate spring can be improved.

In the load detection sensor 5 of the present embodiment, the substrate 51, which is a sheet of the first electrode sheet 50, has the first sheet through hole 55A penetrating from the one surface F1 facing the second electrode sheet 60 to the other surface F2. In addition, the first electrode 52 is electrically connected to the circuit part disposed on the other surface F2 of the substrate 51 through the first conductive member CPA provided in the first sheet through hole 55A. Therefore, it is possible to take out the one terminal 5A to the other surface F2 of the substrate 51. As in the present embodiment, the terminal 5A may be disposed inside the pin through hole 55E other than the first sheet through hole 55A. Therefore, it becomes easy to connect the load detection sensor unit SU to another electronic part such as the connector part 31. In addition, since the circuit part can be provided on the other surface F2, it is not necessary to provide a circuit part on the one surface F1, allowing reduction of unevenness due to the circuit part on the one surface F1. Thus, the sensitivity of the load detection sensor 5 can be stabilized.

In the load detection sensor 5 of the present embodiment, the opening of the first sheet through hole 55A on the one surface side is located in the region of the one surface F1 of the substrate 51 where the first electrode 52 is disposed. The first sheet through hole 55A has the air hole SP communicating with the opening 71 between the first electrode 52 and the second electrode 62 through the electrode through hole 52A provided in the first electrode 52. Therefore, the first sheet through hole 55A serves not only as a connecting hole for electrically connecting the first electrode 52 disposed on one the surface F1 of the substrate 51 and the circuit part on the other surface side of the substrate 51 but also as an exhaust hole for discharging air in the spacer to the outside. Therefore, the durability of the substrate 51 can be improved as compared with a case where a connecting hole and an exhaust hole are separately formed. In addition, it is unnecessary to additionally form an exhaust hole, thereby saving space.

In the load detection sensor 5 of the present embodiment, the substrate 51, which is a sheet of the first electrode sheet 50, has the second sheet through hole 55B penetrating from the one surface F1 facing the second electrode sheet 60 to the other surface F2 at a position different from the position of the first sheet through hole 55A. In addition, the first contact part 53 is electrically connected to the circuit part disposed on the other surface F2 of the substrate 51 through the second conductive member CPB provided in the second sheet through hole 55B. Therefore, it is possible to take out the pair of terminals 5A and 5B to the other surface F2 of the substrate 51. As in the present embodiment, the terminals 5A and 5B may be disposed inside the pin through holes 55E and 55F other than the first sheet through hole 55A. Therefore, it becomes easy to connect the load detection sensor unit SU to another electronic part such as the connector part 31. In addition, since the circuit part can be provided on the other surface F2, it is not necessary to provide a circuit part on the one surface F1, allowing reduction of unevenness due to the circuit part on the one surface F1. Thus, the sensitivity of the load detection sensor 5 can be stabilized.

The load detection sensor 5 of this embodiment includes the resistor 54 that is disposed on the other surface F2 of the substrate 51 and that connects the first electrode 52 and the first contact part 53. Therefore, even when the thickness of the resistor 54 is large, deterioration of the sensitivity of the load-detecting device 1 due to the thickness can be avoided.

In this embodiment, the circuit part and the resistor 54 on the first electrode sheet 50 are provided on the other surface F2 of the substrate 51, and the pair of terminals 5A and 5B is provided in the pin through holes 55E and 55F. Accordingly, parts other than the first electrode 52 and the first contact part 53 can be eliminated from the one surface F1 of the substrate 51. Therefore, unevenness due to other parts can be eliminated on the one surface F1 of the substrate 51, and the sensitivity of load-detecting device 1 can be further improved.

Second Embodiment

Next, a second embodiment of the present invention will be described. In description of the present embodiment, components same as or similar to those of the first embodiment are followed by the same reference signs as those of the first embodiment, and redundant description thereof is not provided unless such components are particularly described.

Figure 12:
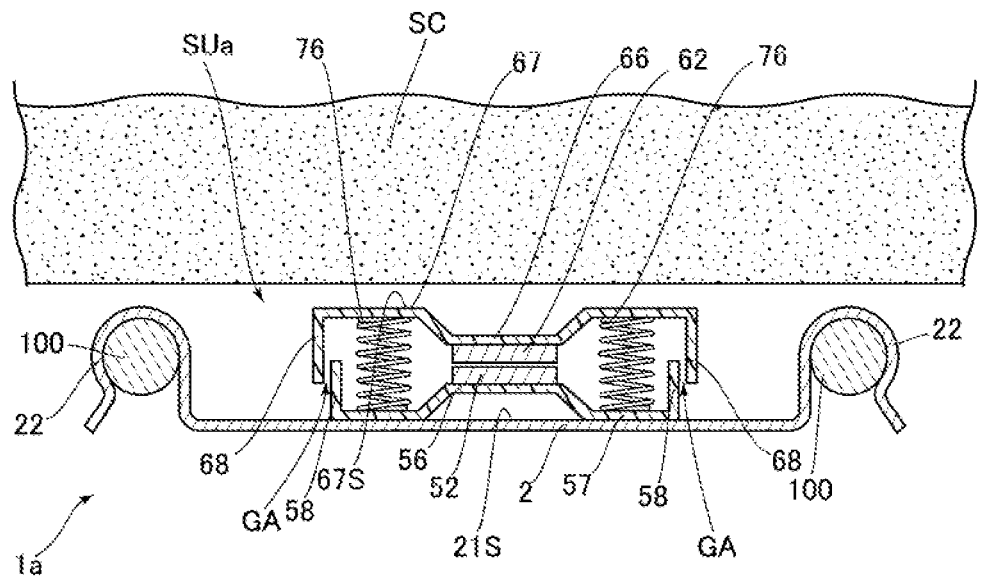
FIG. 12 is a view illustrating a load-detecting device according to a second embodiment of the present invention.

FIG. 12 is a view illustrating a second embodiment of a load-detecting device of the present invention. As illustrated in FIG. 12, a load-detecting device 1a according to the present embodiment includes a base 2 and a load detection sensor unit SUa different from the load detection sensor unit SU of the first embodiment. The load detection sensor unit SUa is mounted on a mount surface 21S of the base 2. The load detection sensor unit SUa according to the present embodiment includes a lower frame 56, an upper frame 66, a pair of electrodes 52 and 62, and a plurality of spring members 76 including coil springs.

The lower frame 56 has a bottom wall 57 and a frame wall 58. The bottom wall 57 is shaped such that the outer peripheral part thereof is in contact with the mount surface 21S of the base 2 and the central part thereof is raised so as to be separated from the mount surface 21S. The frame wall 58 is connected to the outer periphery of the bottom wall 57, and the frame wall 58 rises perpendicularly to the mount surface 21S of the base 2. The first electrode 52 is provided on the upper surface of the central part of the bottom wall 57. The first electrode 52 has, for example, a similar structure as the first electrode 52 of the embodiment described above.

The upper frame 66 has a top wall 67 and a frame wall 68. The substantial shape of the top wall 67 is a shape of the bottom wall 57 of the lower frame 56 inverted upside down. The frame wall 68 is connected to the outer periphery of the top wall 67, and the frame wall 68 hangs down toward the mount surface 21S of the base 2 so as to surround the outer peripheral surface of the frame wall 58 of the lower frame 56. However, a gap GA is provided between the frame wall 58 of the lower frame 56 and the frame wall 68 of the upper frame 66. The second electrode 62 is provided on the lower surface of the central part of the top wall 67. The second electrode 62 has a structure similar to that of the first electrode 52 in the above-described embodiment.

The outer peripheral part of the bottom wall 57 of the lower frame 56 and the outer peripheral part of the top wall 67 of the upper frame 66 are connected by the plurality of spring members 76. The upper frame 66 is supported by the plurality of spring members 76 in a state where the first electrode 52 and the second electrode 62 are separated from each other. In a state where the upper frame 66 is supported as described above, an upper surface 67S of the outer peripheral part of the top wall 67 faces the lower surface of a seat cushion SC with a predetermined distance between them. The upper surface 67S has a planar doughnut shape. The upper surface 67S is a surface to be pressed by the seat cushion SC and is a pressed surface of the load-detecting device according to the present embodiment.

In the present embodiment, the gap GA is provided between the frame wall 58 of the lower frame 56 and the frame wall 68 of the upper frame 66 as described above. Accordingly, the upper frame 66 can be inclined with respect to the lower frame 56 within the gap GA, thus, when viewing the load-detecting device 1a along the direction of the mount surface 21S of the base 2. The upper frame 66 including the upper surface 67S can move with respect to the mount surface 21S such that the angle of the upper surface 67S of the upper frame 66 with respect to the mount surface 21S changes.

The load-detecting device 1 of the first embodiment is structured such that the upper surface 47S pivots to be inclined with the tip of the switch pressing part 43 as the center. On the other hand, when the upper surface 67S of the upper frame 66, which is a pressed surface of the load-detecting device 1a according to the present embodiment, moves so as to be inclined with respect to the mount surface 21S, no reference point is particularly set. Also in the present embodiment, the load-detecting device 1a may be structured such that the amount of change in the angle of the upper surface 67S of the upper frame 66 with respect to the mount surface 21S is larger in the front and back direction than in the right and left direction of the seat device similarly to the first embodiment. In this case, the gap GA between the frame wall 68 of the upper frame 66 and the frame wall 58 of the lower frame 56 should be larger in the front and back direction than in the right and left direction.

Also in this load-detecting device 1a, the upper surface 67S of the upper frame 66 is located at a position at the same height as the height indicated by the broken line SHP in FIG. 3 in a state where a load is not detected. In a state where a load is detected, the upper surface 67S of the upper frame 66 is located at a position at the same height as the height indicated by the broken line SHS in FIG. 3, and the contact surface between the first electrode 52 and the second electrode 62 is located at a height same as the broken line EH in FIG. 3.

Even in the load-detecting device 1a having such a structure, the upper surface 67S can follow the inclination of the lower surface of the seat cushion SC when the lower surface lowers while changing the inclination of the lower surface. Therefore, the upper surface 67S is properly brought into surface contact with the lower surface of the seat cushion SC and pressed by the lower surface, and thus a load can be properly detected also in the load-detecting device 1a of the present embodiment.

In the present embodiment, coil springs are used as the spring members 76, but the spring members 76 may be constituted of, for example, plate springs.

Third Embodiment

Next, a third embodiment of the present invention will be described. In description of the present embodiment, components same as or similar to those of the first embodiment are followed by the same reference signs as those of the first embodiment, and redundant description thereof is not provided unless such components are particularly described.

Figure 13:
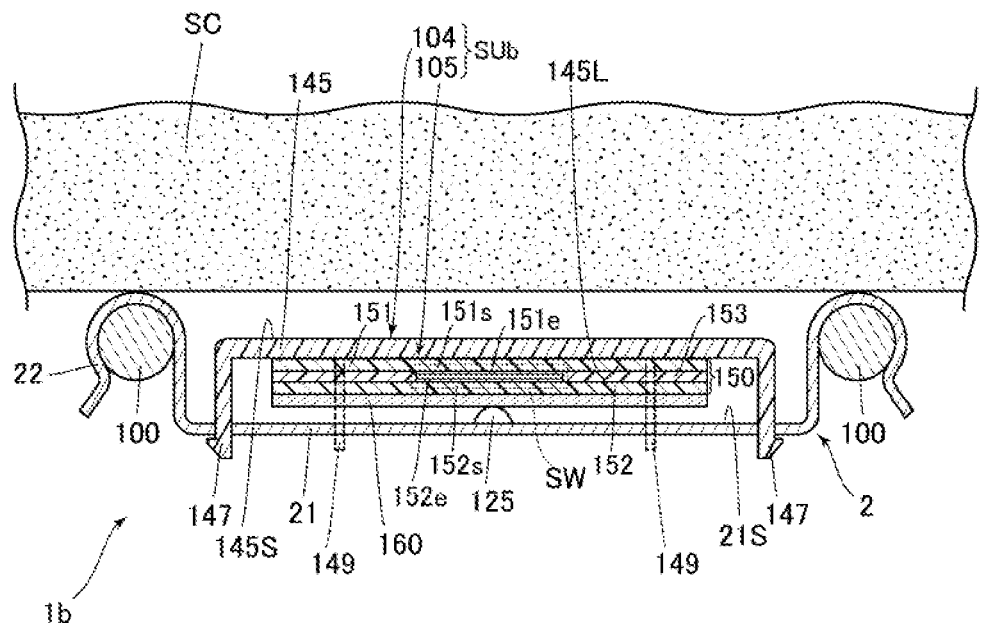
FIG. 13 is a view illustrating a load-detecting device according to a third embodiment of the present invention.

FIG. 13 is a view illustrating a third embodiment of a load-detecting device of the present invention. As illustrated in FIG. 13, a load-detecting device 1b mainly includes a base 2 and a load detection sensor unit SUb. The load detection sensor unit SUb includes a cover 104 and a load detection sensor 105.

The base 2 of the present embodiment is different from the base 2 of the first embodiment in that a switch pressing part 125 is fixed on the base 2. In this way, the base 2 as a mount member includes the switch pressing part 125. In the present embodiment, the switch pressing part 125 is formed in a substantially hemispherical shape that is convex upward and made harder than the seat cushion SC. When the switch pressing part 125 is fixed on the mount surface 21S of the base 2, the switch pressing part 125 protrudes with respect to the mount surface 21S. Thus, when the load detection sensor 105 is mounted on the mount part 21 as illustrated in FIG. 13, the tip of the switch pressing part 125 comes into contact with the load detection sensor 105. Specifically, the tip of the switch pressing part 125 is in contact with a metal plate 160 of the load detection sensor 105 to be described below.

The cover 104 is a lid member that covers a part of the load detection sensor 105 mounted on the mount part 21 and corresponds to the housing cover 4 of the first embodiment. The cover 104 is also a pressing member that presses the switch of the load detection sensor 105 when the cover 104 is pressed by the seat cushion SC. The cover 104 includes a top wall 145 that has a substantially plate shape. The top wall 145 is a substantially circular plate-shaped member. On the outer periphery of the top wall 145, hook pieces 147 each having a hook formed at the tip thereof are connected. Each of the hook pieces 147 is structured to be fitted into a through hole formed in the base 2. By fitting the respective hook pieces 147 into the through holes, the hooks formed at the tips of the hook pieces 147 are hooked at the base 2, and the cover 104 is prevented from coming off. Although not illustrated, a slight gap is formed between the peripheral edges of the through holes and the hook pieces 147 in a state where the hook pieces 147 penetrate the through holes passing through the hook pieces 147.

A lower surface 145L of the top wall 145 of the cover 104 facing the base 2 is substantially planar. A plurality of ribs 149 projecting from the lower surface 145L is provided on the top wall 145 of the cover 104. These ribs 149 are inserted into through holes other than the through holes into which the through holes through which the hook pieces 147 penetrate in a state where the cover 104 covers the switch of the load detection sensor 105 and the respective hook pieces 147 are fitted into the through holes in the base 2. As described above, when the cover 104 is mounted to the base 2, the lower surface 145L of the top wall 145 of the cover 104 is in surface contact with a part of the load detection sensor 105 including a switch SW. Although not illustrated, a slight gap is formed between the peripheral edges of the through holes and the ribs 149 in a state where the ribs 149 penetrate the through holes passing through the ribs 149.

In the present embodiment, the cover 104 is made of a material harder than the seat cushion SC similarly to the switch pressing part 125, and is made of the same material as the housing cover 4 of the first embodiment, for example.

In a state where the load-detecting device 1b assembled in this way is mounted below the seat cushion SC of the seat device, an upper surface 145S of the top wall 145 of the cover 104 faces the lower surface of the seat cushion SC with a predetermined distance from the seat cushion. This upper surface 145S is planar. The upper surface 145S is a surface to be pressed by the seat cushion SC and can be considered as a pressed surface of the load-detecting device 1b. The area of the upper surface 145S is larger than the area of the part of the switch pressing part 125 in contact with the load detection sensor 105.

The load detection sensor 105 includes a switch sheet 150 having the switch SW, and the metal plate 160. The switch sheet 150 is a sheet membrane switch, and includes a first electrode sheet 151 having a first electrode 151e disposed on a first insulating sheet 151s, a spacer 153, and a second electrode sheet 152 having a second electrode 152e disposed on a second insulating sheet 152s.

The first electrode 151e of the first electrode sheet 151 and the second electrode 152e of the second electrode sheet 152 face each other through the opening of the spacer 153 to structure the switch SW in a state where the first electrode sheet 151, the second electrode sheet 152, and the spacer 153 are adhered to one another in this order.

The metal plate 160 is made of a metal plate material having flexibility. Examples of the material of the metal plate 160 include copper, stainless steel, and the like. When the metal plate 160 is stacked on the switch sheet 150, the metal plate 160 covers the switch SW of the switch sheet 150. Specifically, as is apparent from FIG. 13, the metal plate 160 is provided on the side of the second electrode sheet 152 opposite to the spacer 153 (the side opposite to the seat cushion SC side), and covers the second electrode 152e from the base 2 side. The second electrode 152e is closer one of the first electrode 151e and the second electrode 152e to the base 2. In the present embodiment, the metal plate 160 and the switch sheet 150 are adhered to each other. In the above description, the second electrode sheet 152 and the metal plate 160 are separate members, but in the present embodiment, since the metal plate 160 is adhered to the second insulating sheet 152s, the metal plate 160 is integrated with the second electrode sheet 152. Therefore, it can be considered that the second electrode sheet is constituted of the metal plate 160, the second insulating sheet 152s, and the second electrode 152e.

As described above, the load detection sensor 105 having the above-described structure is disposed on the mount part 21 of the base 2. Specifically, the switch sheet 150 having the metal plate 160 and the switch SW is located above the mount part 21, and the tip of the switch pressing part 125 is in contact with a region of the metal plate 160 that is aligned with the switch SW. The area where the switch pressing part 125 is in contact with the metal plate 160 is smaller than the area of the second electrode 152e of the switch SW. Note that the metal plate 160 and the base 2 are not adhered. In this state, the cover 104 covers the load detection sensor 105, so that the load-detecting device 1b is assembled. In a state where the load-detecting device 1b is assembled as described above, the lower surface 145L of the top wall 145 of the cover 104 makes surface contact with the load detection sensor 105.

When the load-detecting device 1b as described above is disposed in the seat device and a person sits on the seat device, the lower surface of the seat cushion SC moves downward due to a load of the person, and the lower surface of the seat cushion SC is brought into contact with the upper surface 145S of the cover 104 to press the entire surface of the upper surface 145S. When the lower surface of the seat cushion SC further moves downward, the pressing force from the seat cushion SC received by the upper surface 145S is concentrated on the switch pressing part 125, and the second electrode sheet 152 also bends due to bending of the metal plate 160. As a result, the second electrode 152e comes into contact with the first electrode 151e, and the switch SW of the load detection sensor 105 is turned on. The switch pressing part 125 of the present embodiment presses one electrode of the switch SW in this manner. Thus, the switch pressing part 125 corresponds to the switch pressing part 43 of the first embodiment, and can be considered as the shaft part. Note that, in the example illustrated in FIG. 13, the height of the shaft part is made low.

In the load-detecting device 1b of the present embodiment, the angle of the cover 104 together with the load detection sensor 105 with respect to the mount surface 21S of the base 2 may change with the tip of the switch pressing part 125 as a reference. That is, the angle of the upper surface 145S of the cover 104, which is the pressed surface to be pressed by the seat cushion SC, with respect to the mount surface 21S may change. Therefore, when the lower surface of the seat cushion SC moves downward while the inclination of the lower surface of the seat cushion SC changes, the upper surface 145S can follow the inclination of the lower surface. Therefore, the upper surface 145S is properly brought into surface contact with the lower surface of the seat cushion SC and pressed by the lower surface, and thus a load can be properly detected also in the load-detecting device 1b of the present embodiment.

In the load-detecting device 1b of the present embodiment, the switch pressing part 125, which is harder than the seat cushion SC, presses a part of the metal plate 160. Thus, the metal plate 160 can be properly bent, and sitting can be properly detected. In addition, creep hardly occurs in metal compared with in resin, and thus a pressing mark is hardly made on the metal plate 160 even when a part of the metal plate 160 is pressed by the switch pressing part 125. Therefore, according to the load-detecting device 1b of the present invention, it is possible to properly detect sitting while suppressing erroneous detection of sitting due to a pressing mark or the like.

Although the load-detecting device of the present invention has been described with reference to the above-described embodiments as examples, the present invention is not limited to the above-described embodiments.

For example, the load-detecting device of the present invention has a possibility to be used as long as presence or absence of a load on a load detection target should be detected. That is, in each of the above-described embodiments, the load-detecting device is disposed below the seat cushion SC of the seat, and whether or not a person is sitting is detected. However, the present invention is not limited to the above-described embodiments and other aspects can be employed. For example, an aspect in which the load-detecting device is disposed below a seat cushion of the nursing care bed may be exemplified. Even in such an aspect, a load can be properly detected when the lower surface of the seat cushion lowers while changing the inclination of the lower surface.

In the above-described embodiments, the load-detecting device is structured such that the upper surfaces 47S and 67S move relative to the mount surface 21S so that the angles of the upper surfaces 47S and 67S, which are the pressed surfaces, with respect to the mount surface 21S change in the front and back direction and the right and left direction of the seat device. However, the present invention is not limited to the above-described structure. For example, the pressed surface may move with respect to the mount surface 21S such that the angle of the pressed surface with respect to the mount surface 21S changes only in the front and back direction. In this case, for example, the load-detecting device may be structured such that the load detection sensor unit SU includes a shaft extending in the right and left direction of the seat device, and the pressed surface may move (pivot) only in the front and back direction with the shaft as the center. Conversely, the load-detecting device may be structured such that the load detection sensor unit SU includes a shaft extending in the front and back direction of the seat device, and the pressed surface may move (pivot) only in the right and left direction with the shaft as the center.

Also in the first embodiment and the third embodiment, the load-detecting device may be structured such that the upper surface 47S moves relative to the mount surface 21S so that the angle of the upper surface 47S with respect to the mount surface 21S change equally in the front and back direction and the right and left direction of the seat device.

In the first embodiment, the load-detecting device is structured such that the tip of the switch pressing part 43, which is a shaft part extending from the upper surface 47S toward the mount surface 21S side, presses the second electrode 62, which is one electrode of the switch SW. However, a member pressing the switch SW and the shaft part having the tip serving as the center of pivot of the upper surface 47S are not necessarily structured separately, and the shaft part may be provided on the lower side of the switch SW as in the third embodiment by disposing the load detection sensor 5 upside down.

In the first embodiment, the load detection sensor unit SU includes the housing cover 4, and in the third embodiment, the load detection sensor unit SUb includes the cover 104. However, the present invention can be structured without the housing cover 4 or the cover 104 as the second embodiment as long as a pressed surface to be pressed by a seat cushion is provided and the angle of the entire pressed surface with respect to the mount surface changes.

In the first embodiment, the housing 3 is not essential. In this case, as the cover 104 of the third embodiment, the housing cover 4 of the first embodiment may be disposed directly on the base 2.

In the third embodiment, the metal plate 160 is not essential. In this case, the switch pressing part 125 may directly press the second electrode sheet 152. In the third embodiment, the switch pressing part 125 as the shaft part for the load detection sensor 105 is provided on the base 2 side, but as in the first embodiment, the switch pressing part 125 may be provided on the cover 104. In this case, it is preferable to provide the metal plate 160 between the first electrode sheet 151 and the switch pressing part 125, which is a part of the cover 104, from the viewpoint of suppressing a pressing mark on the first electrode sheet 151.

In the first embodiment, the first electrode 52 and the second electrode 62 are located between the lower ends 102 and the upper ends 101 of the respective S springs 100, with which the base 2 is engaged. However, according to the present invention, the first electrode 52 and the second electrode 62 are not necessarily located between the lower ends 102 and the upper ends 101 of the S springs 100 as long as the contact surface between the first electrode 52 and the second electrode 62 when sitting is detected is located lower than the upper ends 101 of the S springs 100. For example, the first electrode 52 and the second electrode 62 may be located lower than the lower ends 102 of the S springs 100. In this case, the contact surface between the first electrode 52 and the second electrode 62 when sitting is detected can be located lower than the lower ends 102 of the S springs 100.

In the first embodiment, the mount surface 21S on which the load detection sensor unit SU is mounted is located lower than the lower ends 102 of the respective S springs 100, with which the base 2 is engaged, and the mount surface 21S can be located at the same height as the lower ends 102 of the S springs 100. However, in the present invention, the mount surface 21S may be located higher than the lower ends 102 and lower than the upper ends 101 of the S springs 100. However, from the viewpoint that an oblique load applied from the upper side can be more effectively prevented from acting directly on the mount surface 21S of the base or a part in the vicinity of the mount surface 21S of the load detection sensor unit SU, the mount surface 21S is preferably located at the same height as or lower than the lower ends 102 of the respective S springs 100, with which the base 2 is engaged.

In the first embodiment, the upper surface 47S of the housing cover 4 when sitting is detected is located lower than the upper ends 22U of the hook parts 22 of the base 2 engaged with the S springs 100, and may be located at the same height as the upper ends 22U of the hook parts 22. However, in the present invention, the upper surface 47S of the housing cover 4 when sitting is detected may be located higher than the upper ends 22U of the hook parts 22. However, the upper surface 47S of the housing cover 4 when sitting is detected is preferably located at the same height as or lower than the upper ends 22U of the hook parts 22 since an excessive load to the upper surface 47S can be suppressed.

In the first embodiment, the upper surface 47S of the housing cover 4 when sitting is not detected is located lower than or at the same height as the upper ends 22U of the hook parts 22 of the base 2. However, in the present invention, as long as the upper surface 47S of the housing cover 4 is located at the same height as or higher than the upper ends 101 of the respective S springs 100, with which the base 2 is engaged, when sitting is detected, the upper surface 47S of the housing cover 4 when sitting is not detected may be located higher the upper ends 22U of the hook parts 22 of the base 2. In this case, the upper surface 47S of the housing cover 4 when sitting is detected may be located at the same height as the upper ends 22U of the hook parts 22.

In the first embodiment, an average height position of the lower surface of the seat cushion SC when sitting is not detected is located higher than the upper surface 47S of the housing cover 4. However, the present invention is not limited to this, and the average height position of the lower surface of the seat cushion SC when sitting is not detected may be the same height as the upper surface 47S of the housing cover 4. However, from the viewpoint of suppressing unnecessary pressing of the upper surface 47S of the housing cover 4 by the lower surface of the seat cushion SC, the average height position of the lower surface of the seat cushion SC when sitting is not detected is preferably located higher than the upper surface 47S of the housing cover 4 as in the above-described embodiments.

In the above-described embodiments, examples in which the base 2 is engaged with the S springs have been described, but examples of the base 2 are not limited thereto. For example, the base 2 may be provided on a seat pan, and the seat pan itself may be used as the base.

It is to be noted that respective components of the load-detecting devices 1 to 1b are not limited to those described in the above-described embodiments and the variation, and some of the components may be combined, removed, and altered, and well-known technique may be added to the components, as appropriate, without departing from the object of the present invention.

As described above, according to the present invention, there is provided a load-detecting device that is capable of properly detecting a load and suppressing deterioration of detection accuracy, and can be used for a system provided with a seat cushion. Examples of such a system include a seat device of a vehicle such as a car, and a nursing care bed.

REFERENCE SIGNS LIST 1, 1a, 1b . . . load-detecting device
2 . . . base
3 . . . housing
4 . . . housing cover
5 . . . load detection sensor
21 . . . mount part
21S . . . mount surface
22 . . . hook part
22U . . . upper end
41 . . . arm
42 . . . opening
43 . . . switch pressing part (shaft part)
47S . . . upper surface of housing cover (pressed surface)
50 . . . first electrode sheet
51 . . . substrate
52 . . . first electrode
53 . . . first contact part
54 . . . resistor
56 . . . lower frame
57 . . . bottom wall of lower frame
58 . . . frame wall of lower frame
60 . . . second electrode sheet
61 . . . metal sheet
62 . . . second electrode
63 . . . second contact part
66 . . . upper frame
67 . . . top wall of upper frame
67S . . . upper surface of upper frame (pressed surface)
68 . . . frame wall of upper frame
70 . . . spacer
76 . . . spring member
100 . . . S spring
101 . . . upper end of S spring
102 . . . lower end of S spring
104 . . . cover
105 . . . load detection sensor
125 . . . switch pressing part (shaft part)
145S . . . upper surface of cover (pressed surface)
150 . . . switch sheet
151 . . . first electrode sheet
152 . . . second electrode sheet
153 . . . spacer
160 . . . metal plate
AP . . . connection maintaining part
SC . . . seat cushion
SU . . . load detection sensor unit
SW . . . switch

The invention claimed is:

1. A load-detecting device comprising:
a load detection sensor unit including a pressed surface configured to be pressed by a seat cushion and a pair of electrodes, the electrodes being brought into contact with each other when the pressed surface is pressed; and
a base including a mount surface on which the load detection sensor unit is mounted, wherein
the entire pressed surface moves with respect to the mount surface such that an angle of the entire pressed surface with respect to the mount surface changes by inclining in a front direction, in a back direction, in a right direction and in a left direction while bringing the electrodes into contact with each other.

2. The load-detecting device according to claim 1, wherein
the seat cushion is a seat cushion in a seat device, and
an amount of change in the angle in the front and back direction of the seat device is larger than an amount of change in the angle in the right and left direction of the seat device.

3. The load-detecting device according to claim 1, wherein
the load detection sensor unit includes a shaft part that is integrated with the pressed surface and extends from the pressed surface side toward the mount surface side, and
the entire pressed surface is configured to pivot with a tip of the shaft part as a center.

4. The load-detecting device according to claim 3, wherein the shaft part presses one of the electrodes in pair with the tip.

5. The load-detecting device according to claim 1, wherein
the load detection sensor unit includes a shaft part configured to press one of the electrodes in pair on the base side, and
the entire pressed surface is configured to pivot with a tip of the shaft part as a center.

6. The load-detecting device according to claim 5, wherein
the load detection sensor unit further includes a spacer having an opening formed therein and electrode sheets in pair provided on respective sides of the spacer, the electrodes in pair are respectively provided on surfaces of the electrode sheets in pair and face each other through the opening, the surfaces being on the spacer side, and an electrode sheet on the shaft part side of the electrode sheets in pair includes a metal plate at a position aligned with at least a part where the pair of electrodes is provided.

7. The load-detecting device according to claim 6, wherein the electrode sheet on the shaft part side of the electrode sheets in pair is made of the metal plate, and the metal plate serves as at least a part of the electrode on the electrode sheet on the shaft part side.

8. The load-detecting device according to claim 6, wherein the electrode sheet on the shaft part side of the electrode sheets in pair includes an insulating sheet and the metal plate that is disposed on a surface on the shaft part side of the insulating sheet.

9. The load-detecting device according to claim 1, wherein the seat cushion is a seat cushion in a seat device, and an amount of change in the angle in a front and back direction of the seat device is 5 degrees or less.

10. The load-detecting device according to claim 9, wherein the amount of change in the angle in the front and back direction of the seat device is 0.5 degrees or more.

* * * * *